United States Patent
Chung et al.

(10) Patent No.: US 11,928,997 B2
(45) Date of Patent: Mar. 12, 2024

(54) ELECTRONIC DEVICE FOR PROVIDING EXECUTION SCREEN OF APPLICATION, METHOD FOR OPERATING THE SAME, AND STORAGE MEDIUM

(71) Applicant: SAMSUNG ELECTRONICS CO., LTD., Suwon-si (KR)

(72) Inventors: Jinkyo Chung, Suwon-si (KR); Won Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 17/508,317

(22) Filed: Oct. 22, 2021

(65) Prior Publication Data
US 2022/0130304 A1 Apr. 28, 2022

Related U.S. Application Data

(63) Continuation of application No. PCT/KR2021/014813, filed on Oct. 21, 2021.

(30) Foreign Application Priority Data

Oct. 23, 2020 (KR) .................. 10-2020-0138099

(51) Int. Cl.
*G09G 3/00* (2006.01)
*G06F 3/0482* (2013.01)

(52) U.S. Cl.
CPC ........... *G09G 3/035* (2020.08); *G06F 3/0482* (2013.01); *G09G 2340/045* (2013.01); *G09G 2354/00* (2013.01)

(58) Field of Classification Search
CPC .................. G06F 3/0482; G09G 3/035; G09G 2340/045; G09G 2354/00
See application file for complete search history.

(56) References Cited

U.S. PATENT DOCUMENTS

| | | | |
|---|---|---|---|
| 11,106,245 B2* | 8/2021 | Shim | G06F 3/0414 |
| 2013/0021379 A1* | 1/2013 | Sirpal | G06F 3/0483 |
| | | | 345/659 |

(Continued)

FOREIGN PATENT DOCUMENTS

| | | |
|---|---|---|
| KR | 10-2013-0120761 | 11/2013 |
| KR | 10-2014-0100149 | 8/2014 |

(Continued)

OTHER PUBLICATIONS

International Search Report and Written Opinion dated Jan. 20, 2022 in corresponding International Application No. PCT/KR2021/014813.
European Search Report dated Dec. 18, 2023 for EP Application No. 21883287.1.

(Continued)

*Primary Examiner* — Kevin M Nguyen
(74) *Attorney, Agent, or Firm* — Nixon & Vanderhye P.C.

(57) ABSTRACT

An electronic device may comprise a flexible display, and at least one processor. The at least one processor may be configured to control the display to: display an execution screen of a first application in a first area of the display in a first position state, expand the display to include the first area and a second area, in response to a switch from the first position state to a second position state, display, in the second area, at least one object representing an executable application based on application attribute information, based on the display being expanded, and display, on the expanded display, the execution screen of the first application together with an execution screen of an application corresponding to the selected object, in response to selection of any one of the at least one object.

17 Claims, 22 Drawing Sheets

(56) References Cited

U.S. PATENT DOCUMENTS

| | | | |
|---|---|---|---|
| 2014/0218375 A1 | 8/2014 | Kim | |
| 2014/0340299 A1* | 11/2014 | Lee | G06F 3/147 |
| | | | 345/156 |
| 2014/0368545 A1* | 12/2014 | Ban | G06F 3/1423 |
| | | | 345/634 |
| 2016/0349971 A1 | 12/2016 | Chi et al. | |
| 2017/0061932 A1* | 3/2017 | Kwon | G06F 3/0487 |
| 2017/0147189 A1* | 5/2017 | Ryu | G06F 3/04886 |
| 2018/0275770 A1 | 9/2018 | Kang et al. | |
| 2018/0284964 A1 | 10/2018 | Kang et al. | |
| 2018/0329514 A1* | 11/2018 | Kwon | G06F 3/03 |
| 2018/0374452 A1* | 12/2018 | Choi | G06F 3/04886 |
| 2019/0278336 A1* | 9/2019 | Choi | G06F 1/1677 |
| 2020/0310492 A1 | 10/2020 | Kim et al. | |
| 2021/0089081 A1 | 3/2021 | Ro et al. | |

FOREIGN PATENT DOCUMENTS

| | | |
|---|---|---|
| KR | 10-2016-0139320 | 12/2016 |
| KR | 10-2017-0024942 | 3/2017 |
| KR | 10-2017-0038308 | 4/2017 |
| KR | 10-2017-0043374 | 4/2017 |
| KR | 10-2017-0050270 | 5/2017 |
| KR | 10-2017-0059815 | 5/2017 |
| KR | 10-2017-0060519 | 6/2017 |
| KR | 10-2017-0062121 | 6/2017 |
| KR | 10-2017-0083405 | 7/2017 |
| KR | 10-2018-0020669 | 2/2018 |
| KR | 10-2018-0020737 | 2/2018 |

OTHER PUBLICATIONS

European Information on Search Strategy for EP 21883287.1.

* cited by examiner

ELECTRONIC DEVICE FOR PROVIDING EXECUTION SCREEN OF APPLICATION, METHOD FOR OPERATING THE SAME, AND STORAGE MEDIUM

CROSS-REFERENCE TO RELATED APPLICATIONS

This application is a continuation of International Application No. PCT/KR2021/014813 designating the United States, filed on Oct. 21, 2021, in the Korean Intellectual Property Receiving Office and claiming priority to Korean Patent Application No. 10-2020-0138099, filed on Oct. 23, 2020, in the Korean Intellectual Property Office, the disclosures of which are incorporated by reference herein in their entireties.

BACKGROUND

Field

The disclosure relates an electronic device for providing an execution screen of an application, an operation method thereof, and a storage medium.

Description of Related Art

More and more services and additional functions are being provided through electronic devices, e.g., smartphones, or other portable electronic devices. To meet the needs of various users and raise use efficiency of electronic devices, communication service carriers or device manufacturers are jumping into competitions to develop electronic devices with differentiated and diversified functionalities. Accordingly, various functions that are provided through electronic devices are evolving more and more.

Further, various types of flexible electronic devices have been developed thanks to the development of electronic technology. Such a flexible electronic device may secure portability while providing a larger display. For example, as the flexible electronic device is transformable by the user applying force, it may provide a foldable, bendable, or rollable display.

In an electronic device including a flexible display, the size of the display area may be changed as, e.g., a structure forming the electronic device is moved to change the screen between an open and closed state.

In the structure in which the screen output area of the display may be expanded as described above, there is a need to display various user interfaces to correspond to the user's shape change operation on the display.

SUMMARY

According to an example embodiment, an electronic device may comprise: a flexible display, and at least one processor. The at least one processor may be configured to: control the display to: display an execution screen of a first application in a first area of the display in a first position state, expand the display to include the first area and a second area, in response to a switch from the first position state to a second position state, display, in the second area, at least one object representing an executable application based on application attribute information, based on the display being expanded, and display, on the expanded display, the execution screen of the first application along with an execution screen of an application corresponding to the selected object, in response to selection of any one of the at least one object.

According to an example embodiment, a method for providing an execution screen of an application by an electronic device may comprise: displaying an execution screen of a first application in a first area of a flexible display in a first position state, expanding the display to include the first area and a second area, in response to a switch from the first position state to a second position state, displaying, in the second area, at least one object representing an executable application based on application attribute information, based on the display being expanded, and displaying, on the expanded display, the execution screen of the first application along with an execution screen of an application corresponding to the selected object, in response to selection of any one of the at least one object.

According to an example embodiment, a non-transitory computer-readable storage medium having stored thereon instructions which to, when executed by at least one processor, cause the at least one processor to perform at least one operation. The at least one operation may comprise: controlling a display to: display an execution screen of a first application in a first area of a flexible display in a first position state, expand the display to include the first area and a second area, in response to a switch from the first position state to a second position state, display, in the second area, at least one object representing an executable application based on application attribute information, based on the display being expanded, and display, on the expanded display, the execution screen of the first application along with an execution screen of an application corresponding to the selected object, in response to selection of any one of the at least one object.

According to various example embodiments, in the structure in which the screen output area of the display may be expanded, it is possible to display various user interfaces to correspond to the user's shape change operation on the display.

According to various example embodiments, in an electronic device providing an execution screen of an application, when a shape change operation is performed, an object representing an executable application may be displayed in at least an expanded portion of the display and, in response to selection for the object, the execution screen of the application corresponding to the selected object, along with the execution screen of the running application, may be displayed. Thus, it is possible to use the electronic device more easily and conveniently.

According to various example embodiments, at least one application based on application attribute information may be displayed in a partial area of the expanded display while the execution screen of an application is displayed. Thus, the user may work using desired, simultaneously executable applications. Therefore, relevant work efficiency and convenience may be increased.

Effects of the disclosure are not limited to the foregoing, and other unmentioned effects would be apparent to one of ordinary skill in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The terms as used herein are provided merely to describe various example embodiments, but not to limit the scope of any embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
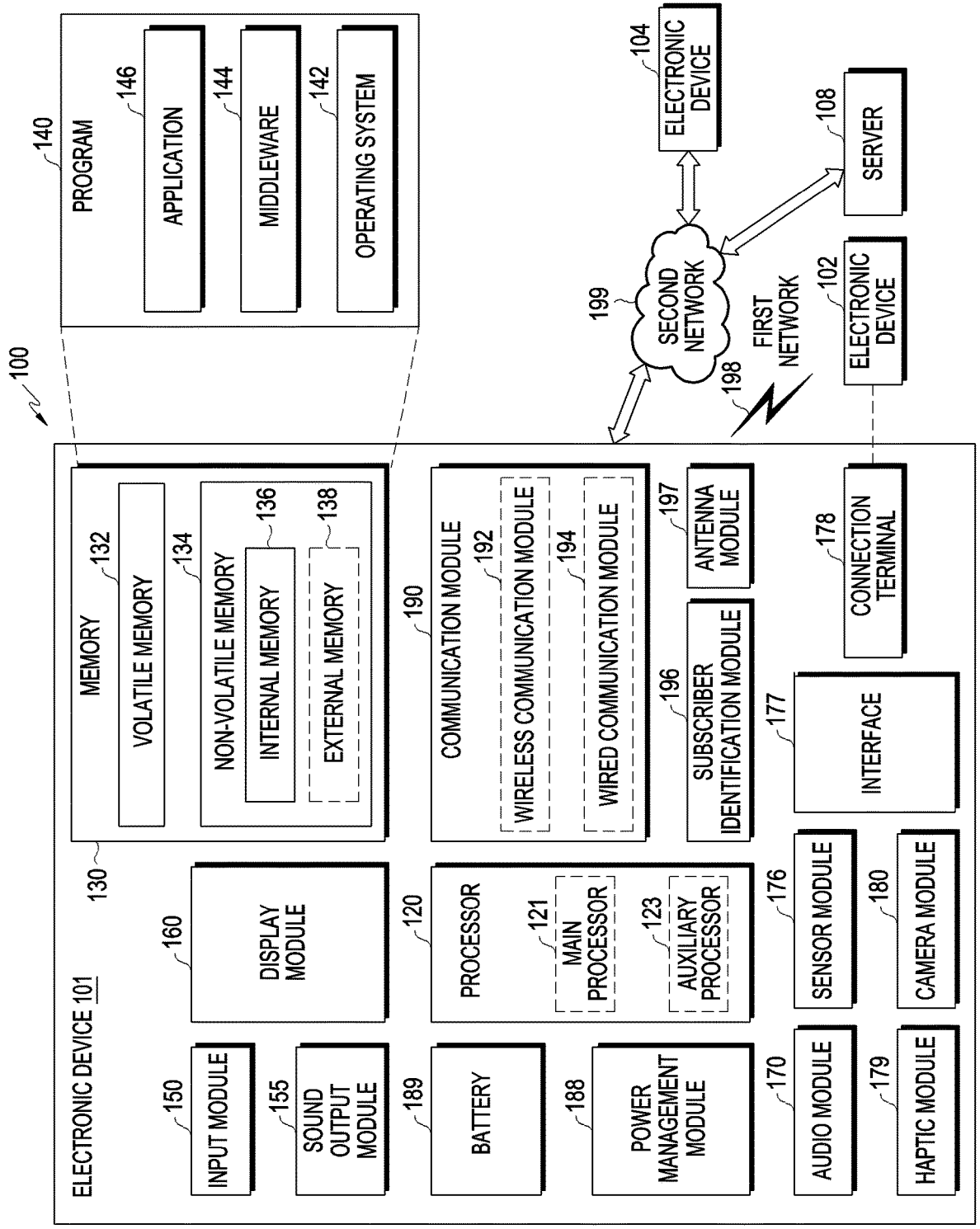
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
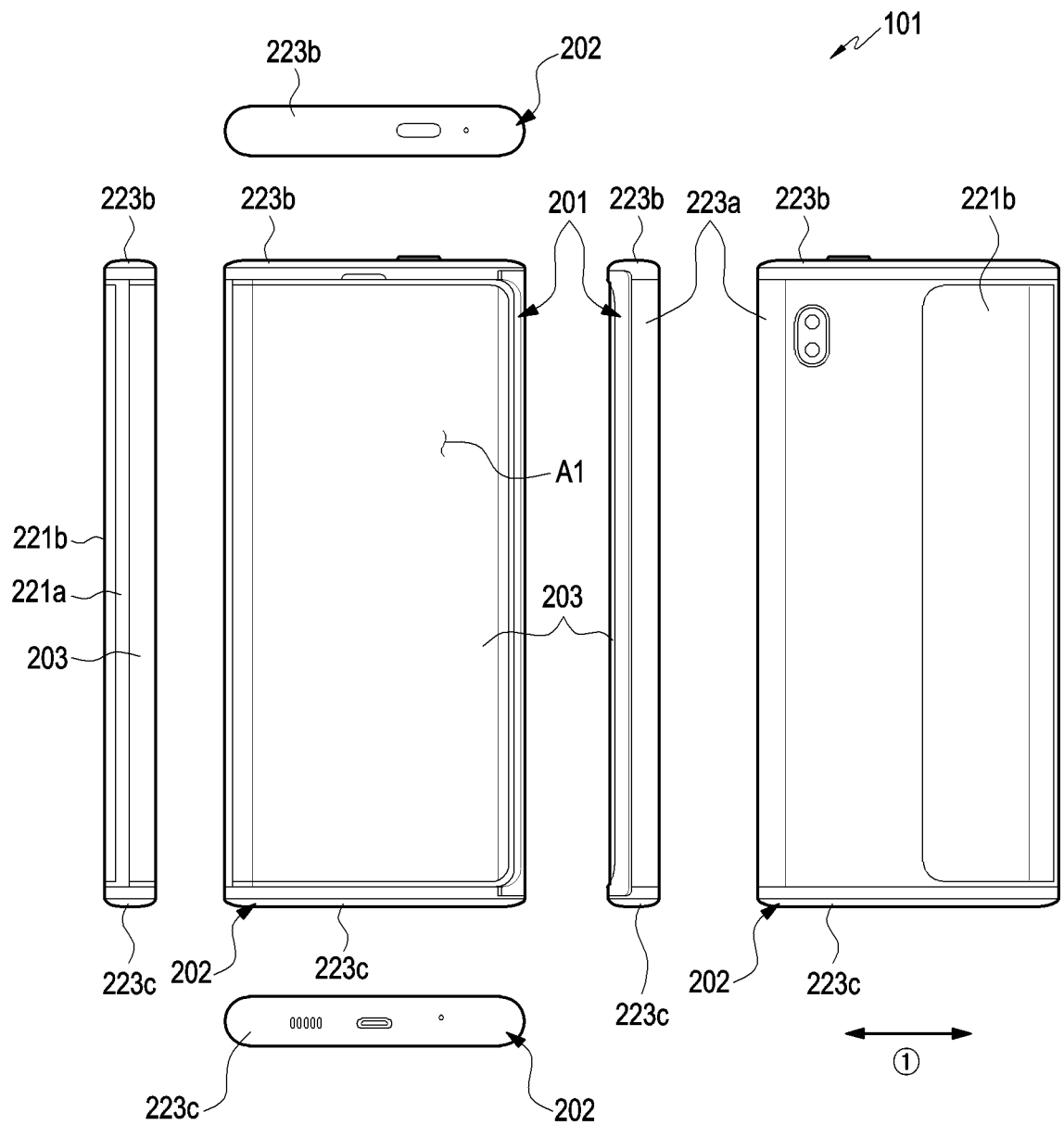
FIG. 2A is a diagram illustrating an electronic device, wherein a portion of a flexible display is received in a second structure according to various embodiments.
Figure 2B:
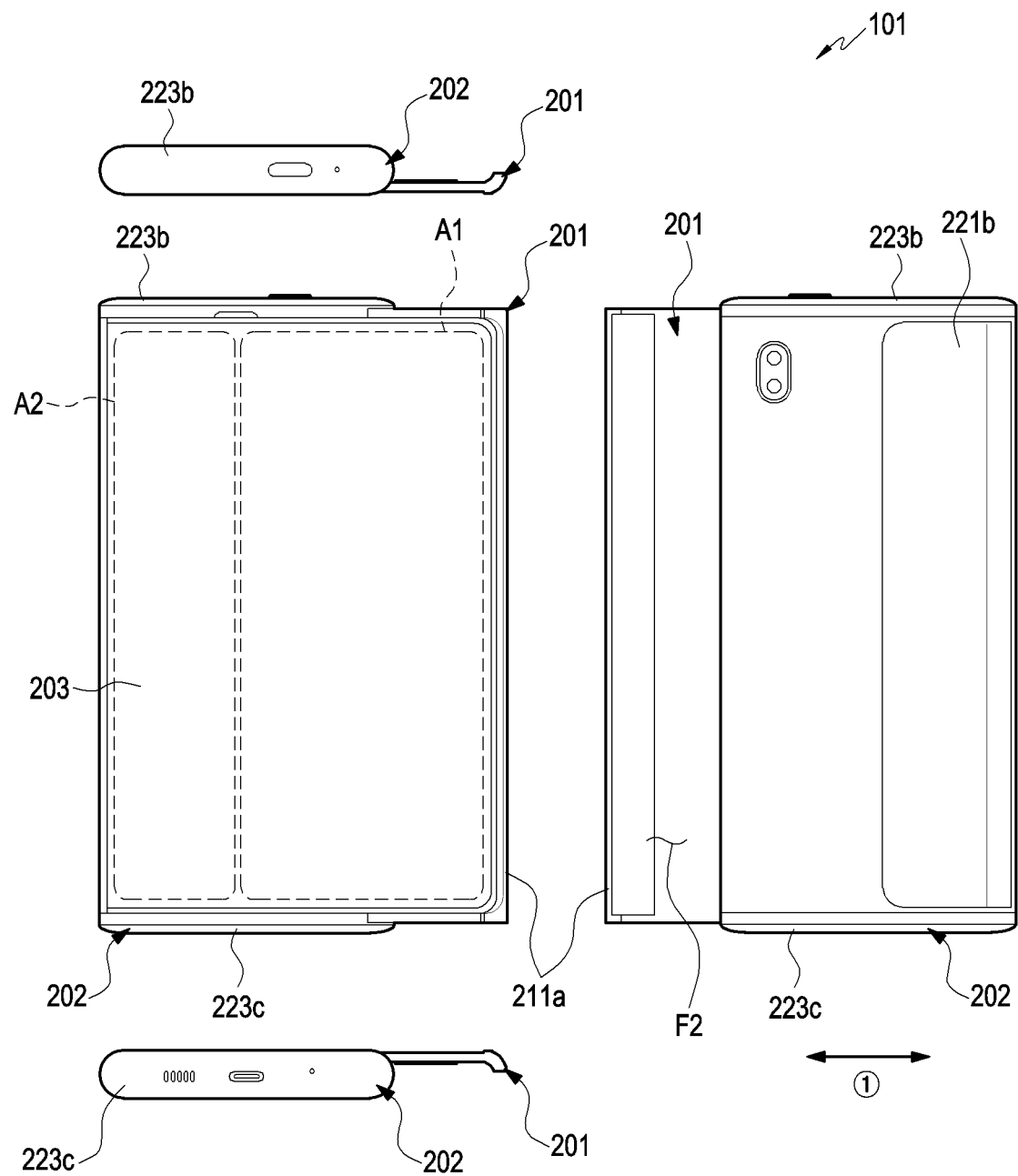
FIG. 2B is a diagram illustrating an electronic device, wherein most of a flexible display is exposed to the outside of a second structure according to various embodiments.

FIG. 2A is a diagram illustrating an electronic device according to various embodiments, wherein a portion of a flexible display (e.g., the display device 160 of FIG. 1 or the display 203) is received in a second structure. FIG. 2B is a diagram illustrating an electronic device according to various embodiments, wherein most of a flexible display is exposed to the outside of a second structure. In the disclosure, the type of the electronic device 101 illustrated in FIGS. 2A and 2B may be referred to, for example, as a "slidable electronic device".

The state shown in FIG. 2A may be referred to as a first structure 201 being closed with respect to a second structure 202, and the state shown in FIG. 2B may be referred to as the first structure 201 being opened with respect to the second structure 202. According to various embodiments, the "closed state" or "opened state" may be defined as a closed or opened state of the electronic device.

Referring to FIGS. 2A and 2B, an electronic device 101 may include a first structure 201 and a second structure 202 disposed to be movable in the first structure 201. According to an embodiment, the electronic device 101 may be interpreted as having a structure in which the first structure 201 is slidably disposed on the second structure 202. According to an embodiment, the first structure 201 may be disposed to perform reciprocating motion by a predetermined distance in a predetermined direction with respect to the second structure 202, for example, a direction indicated by an arrow ①.

According to an embodiment, the first structure 201 may be referred to as, for example, a first housing, a slide unit, or a slide housing, and may be disposed to reciprocate on the second structure 202. According to an embodiment, the second structure 202 may be referred to as, for example, a second housing, a main part, or a main housing, and may receive various electric or electronic components such as a main circuit board or a battery. A portion (e.g., the first area A1) of the display 203 may be seated on the first structure 201. According to an embodiment, another portion (e.g., the second area A2) of the display 203 may be received (e.g., slide-in) into the inside of the second structure 202 or exposed (e.g., slide-out) to the outside of the second structure 202 as the first structure 201 moves (e.g., slides) relative to the second structure 202.

According to various embodiments, the first structure 201 may include a first plate 211a (e.g., a slide plate) and may include a first surface formed with at least a portion of the first plate 211a and a second surface F2 facing away from the first surface. According to an embodiment, the second structure 202 may include a second plate 221a (e.g., a rear case), a first sidewall 223a extending from the second plate 221a, a second sidewall 223b extending from the first sidewall 223a and the second plate 221a, a third sidewall 223c extending from the first sidewall 223a and the second plate 221a and positioned parallel to the second sidewall 223b, and/or a rear plate 221b (e.g., a rear window). According to an embodiment, the second sidewall 223b and the third sidewall 223c may be formed to be perpendicular to the first sidewall 223a. According to an embodiment, the second plate 221a, the first sidewall 223a, the second sidewall 223b, and the third sidewall 223c may be formed to have an opening (e.g., in the front face) to receive (or surround) at least a portion of the first structure 201. For example, the first structure 201 may be coupled to the second structure 202 in a state in which it is at least partially surrounded, and the first structure 201 may be guided by the second structure 202 to slide in a direction parallel to the first surface or the second surface F2, for example, direction indicated with the arrow ①.

According to various embodiments, as the first structure 201 moves (e.g., slides) with respect to the second structure 202, the area of the display 203 may be expanded to include a first area A1 and a second area A2.

According to an embodiment, the display 203 may include the first area A1 and the second area A2. The second area A2 may extend from the first area A1 and be inserted or received into the inside of the second structure 202 (e.g., housing) or be exposed to the outside of the structure 202 as the first structure 201 slides. The second area A2 may be moved while being substantially guided by a roller mounted on the second structure 202 and may thus be received into the inside of or exposed to the outside of the second structure 202. For example, while the first structure 201 slides, a portion of the second area A2 may be deformed into a curved shape in a position corresponding to the roller.

According to various embodiments, if the first structure 201 moves from the closed state to the opened state, the second area A2 of the display 203 is gradually exposed to the outside of the second structure 202 and, along with the first area A1, may form a substantially flat surface. In an embodiment, the second area A2 may be at least partially received inside the second structure 102, and a portion of the second area A2 may be exposed to the outside even in the state shown in FIG. 2A (e.g., the closed state).

FIGS. 3A, 3B, 3C and 3D are diagrams illustrating an example sliding operation of a flexible display of an electronic device, according to various embodiments.

According to various embodiments, the electronic device 101 may have a plurality of position states as illustrated in FIGS. 3A, 3B, 3C and 3D. According to various embodiments, at least a portion of the display of the electronic device 101 may be exposed to the outside through the housing. According to various embodiments, the display may include one or more displays. According to various embodiments, the display may include a flexible display (e.g., a slidable display, a foldable display, a rollable display, or a stretchable display).

According to various embodiments, a state in which the exposed area of the flexible display is smallest may be referred to as a 'closed state', and a state in which the exposed area of the flexible display is largest may be referred to as an 'opened state'.

Figure 3A:
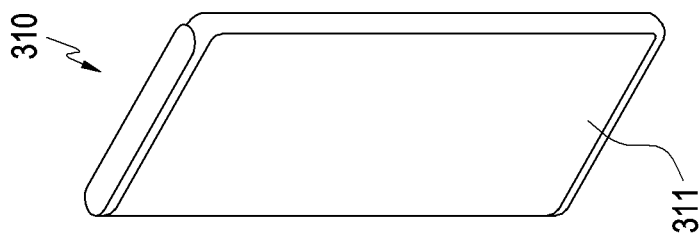
FIGS. 3A, 3B, 3C and 3D are diagrams illustrating an example sliding operation of a flexible display of an electronic device, according to various embodiments.

According to various embodiments, referring to FIG. 3A, at least a portion of the display may be moved into or out of the housing according to a sliding operation. For example, upon receiving a deform (e.g., sliding) operation or sliding expand command in the closed state, a portion of the flexible display which is positioned inside the housing may be slid out of the housing so that the slidable electronic device 101 may change from the closed state to the opened state. For example, the exposed portion 311 of the display when the electronic device 101 is in the closed state may be referred to as a first area (or first portion), and the exposed portion of the display when the electronic device 101 is in the partially opened state or fully opened state may be referred to as a third area (or third portion). For example, the third area 313 may be the first area 311 plus the expanded area (or second area) 312 of the display according to the sliding operation for expansion. For example, as illustrated in FIG. 3B, according to a sliding operation for expansion, the area (e.g., the first area 311) of the display may be expanded to further include the second area 312, and in the fully opened state, as illustrated in FIG. 3C the size of the second area 312 may be larger as compared to FIG. 3B, e.g., the size of the second area 312 may have the same size as, e.g., the first area 311.

As illustrated in FIG. 3A, when the display position state is a first position state (e.g., the closed state) 310, the first area 311 corresponding to the first position state may refer, for example, to the entire area of the display of the electronic device 101. According to various embodiments, a first execution screen of at least one application may correspond to the first area 311. Accordingly, the size of the first execution screen of the at least one application may correspond to the size of the first area 311. Here, at least one application execution screen may be displayed in the first area 311. For example, the first area 311 may be split into a plurality of areas, such as an upper area and a lower area. Further, two or more application execution screens may be displayed corresponding to each area.

Figure 3B:
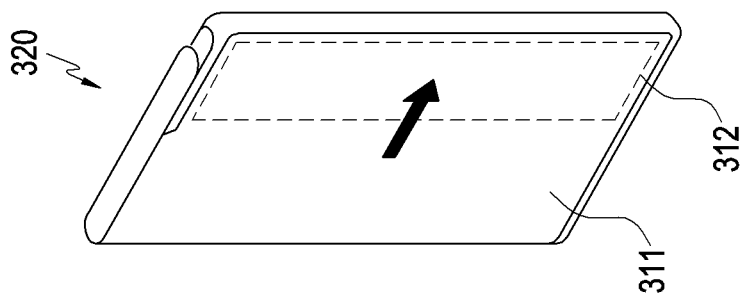
Figure 3C:
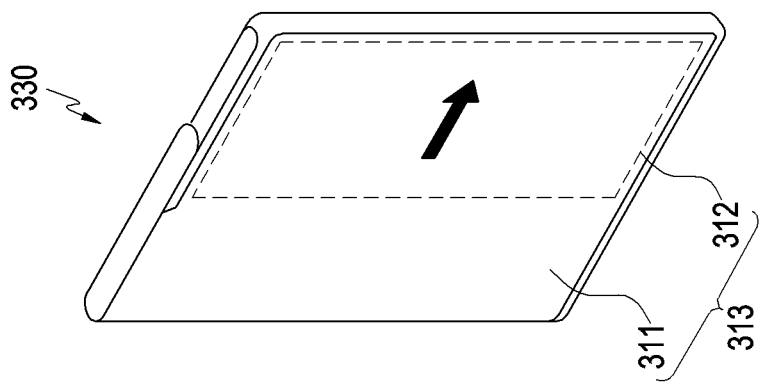
Figure 3D:
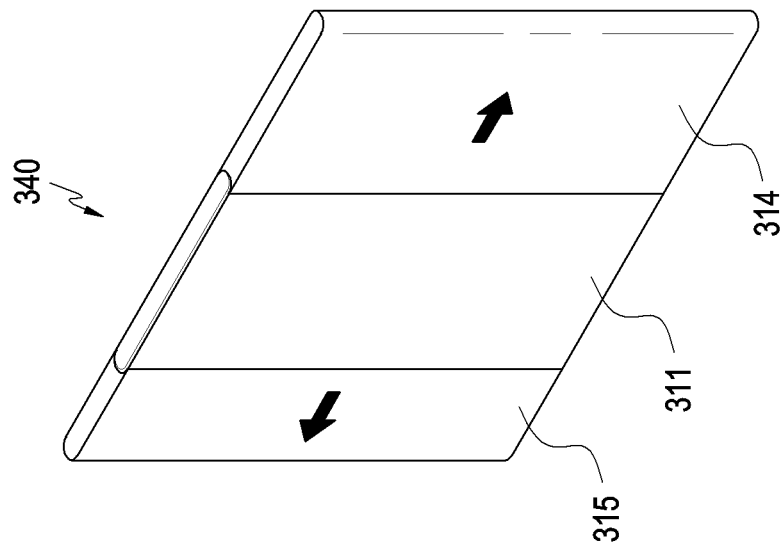

As illustrated in FIG. 3B, if the display position state switches from the first position state (e.g., closed state) to a second position state (e.g., partially opened state) 320 according to the sliding operation for expansion, the second area 312 may correspond to a partial area indicated by a dotted line of the display. As illustrated in FIG. 3B, in the slidable electronic device 101 in the closed state, the exposed portion 312 of the display may be expanded according to the sliding operation.

According to various embodiments, in the second position state, at least one application based on application attribute information or an object representing notification or information for the at least one application may be displayed in the second area 312.

According to various embodiments, if the application is a non-resizable application (or not supporting expansion mode) based on the attribute information for the at least one application displayed in the first area 311, an object representing the at least one application based on the application attribute information may be displayed in the second area 312 in the second position state as illustrated in FIG. 3B. According to an embodiment, the at least one object may include at least one of at least one image, icon, pop-up window, or selectable menu corresponding to each of at least one application.

According to an embodiment, if the sliding distance from a reference axis (e.g., a reference line or a longer side of the electronic device 101) reaches a predetermined distance according to the sliding operation for expansion, it may be determined as the second position state (e.g., partially opened state) 320, so that at least one object based on application attribute information may be provided in the second area 312. According to an embodiment, if the sliding distance is maintained for a predetermined time after moving from the reference axis by a certain distance according to the sliding motion for the expansion, it may be determined as the second position state (e.g., partially opened state) 320 so that at least one object based on application attribute information may be provided in the area 312.

As illustrated in FIG. 3C, if the display position state switches from the second position state (e.g., partially opened state) to the third position state (e.g., fully opened state) 320 according to the sliding operation, the third area 313 may refer, for example, to the entire area of the display of the electronic device 101 and may include the first area 311 and the extended second area 312.

According to various embodiments, if the running application is a resizable (or expansion mode-supporting) application based on attribute information for at least one application displayed in the first area 311 of FIG. 3A, the execution screen of the at least one application may be resized and displayed to correspond to the size of the third area 313 according to the sliding operation. For example, the execution screen of the application resized to correspond to the size of the entire display area of the electronic device 101 may be displayed.

According to various embodiments, if it becomes the third position state (e.g., fully opened state) 320 in response to selection of any one of at least one object displayed in the second area 312, as illustrated in FIG. 3C, a portion of the display may be exposed to the outside so that the size of the second area 312 of FIG. 3B may be expanded. Accordingly, the execution screen of the application corresponding to the selected object, together with the execution screen of the at least one application, may be displayed in the entire display area.

Meanwhile, although an example has been described above in which the display of the electronic device 101 expands to the right, embodiments of the disclosure may not be limited thereto. For example, as in a fourth position state (e.g., opened state) 340 of FIG. 3D, the display may be expanded or contracted in both directions 314 and 315 of the electronic device 101 or to the right 315 alone or to the left 314 alone. Accordingly, the entire display area may be expanded to include the first area 311 and areas 314 and 415 corresponding to both the directions or an area 314 or 315 corresponding to any one direction. In an embodiment, the display may be expanded or contracted upward or downward of the electronic device 101.

Figure 4:
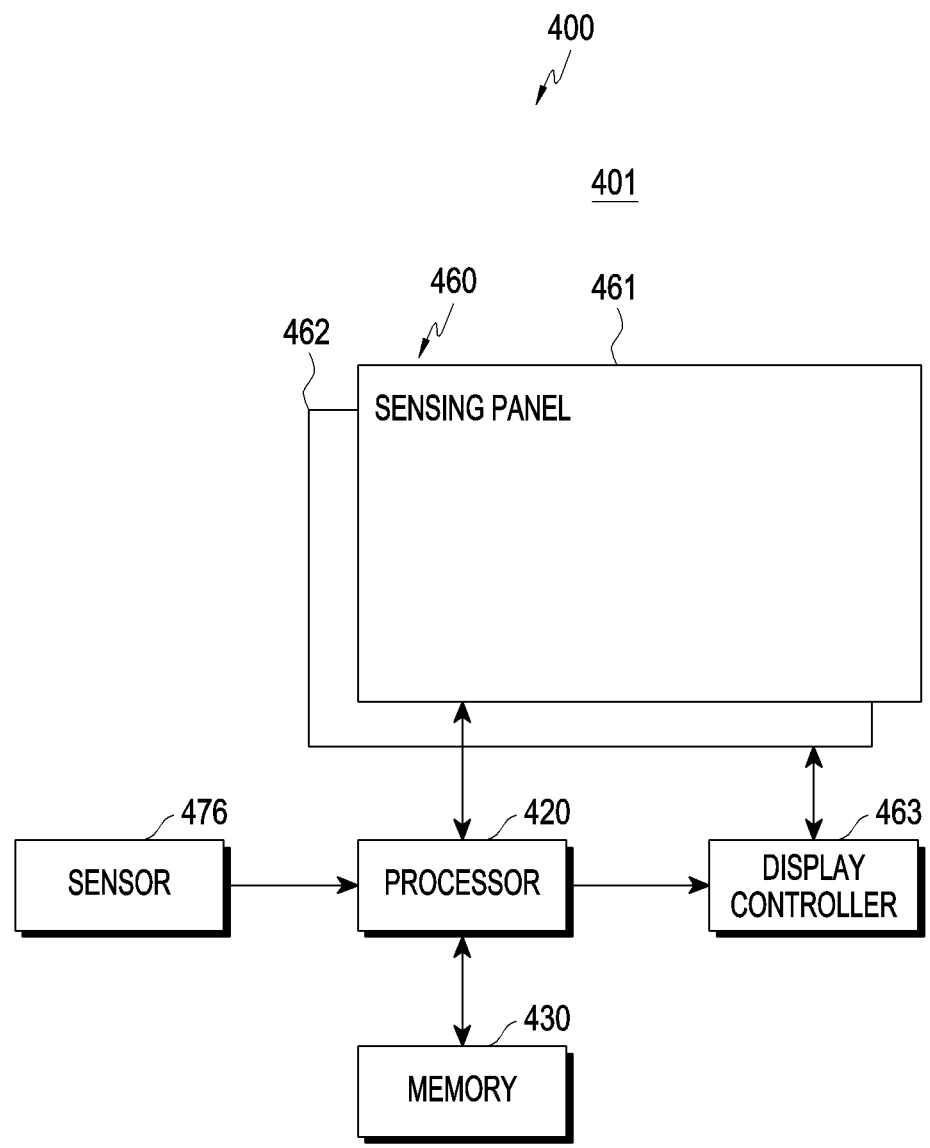
FIG. 4 is a block diagram illustrating an example internal configuration of an electronic device according to various embodiments.

FIG. 4 is a block diagram 400 illustrating an example internal configuration of an electronic device according to various embodiments.

Referring to FIG. 4, an electronic device 401 may include a sensor 476, at least one processor (e.g., including processing circuitry) 420, a memory 430, a display 460 (e.g., the display device 160 of FIG. 1), and a display controller 463.

The display 460 may simultaneously support input/output functions of data and may detect touches. According to an embodiment, the display 460 may include a sensing panel 461, a display panel 462, and the display controller 463. Although it is described in connection with FIG. 4 that the sensing panel 461 is included in the display 460, it may operate as an input panel different from the display 460 by forming a layer structure with the display panel 462. According to an embodiment, the display 460 may be referred to as a touchscreen. The sensing panel 461 may detect the position of a touch input of a finger or a stylus pen, and the display panel 462 may output an image. The display controller 463 may be a driving circuit that controls the display panel 462 to output an image through the display panel 462.

The sensor 476 may include various sensors and/or sensing circuitry and detect a shape change operation (e.g., a sliding operation) for expanding or reducing the display. According to an embodiment, the sensor 476 may include a plurality of Hall sensors and may expand or contract the display 460 based on the result of detection by the Hall sensor.

The memory 430 may store a plurality of applications and attribute information for the applications. According to an embodiment, each application has its own application attribute information. The application attribute information may include at least one piece of attribute information, such as a resizing attribute, a multi-instance attribute, a video attribute, a productivity category attribute, a frequently used application attribute, and a game attribute.

The resizing attribute may refer to an attribute indicating whether the display may be expanded by the size of the expanded display, in response to the expansion of the display. The multi-instance attribute may refer to an attribute indicating whether an application may be executed simultaneously while the application is running The video attribute may refer to an attribute indicating whether an application is capable of executing a video application. As an example, if an application is an application present in the 'settings>advanced features>video enhanced feature list' in the electronic device, the application may be classified as an application having the video attribute. The productivity category attribute may refer to one of the attributes classified when an application is registered in the application store. For example, an application corresponding to a designated item in a 'productivity' category in a store providing applications may correspond thereto. Examples of applications having the productivity category attribute may include applications, such as memos, notes, calendars, and calculators. The frequently used application attribute may refer to an attribute that may be obtained by measuring the frequency of use for each application. An application gathered in the 'game launcher' related to execution of a game application may be classified as an application having the game attribute. An application may be classified based on attribute information other than those described above.

The memory 430 may store priorities. According to an embodiment, the processor 420 may also consider priorities when determining a display scheme for a plurality of applications based on the application attribute information.

According to an embodiment, the priority may be determined based on attribute information for each application, and it may be determined, e.g., in the order of an application having the video attribute, an application having the game attribute, an application having the productivity category attribute, an application having the frequently used application attribute, and other applications. The priority may be changed by the user through the setting menu. As such, for an application having a purpose of use, such as playing video or game, the electronic device 401 may assign a higher priority than the other applications and perform control so that an execution screen having the higher priority is displayed overlaid on other execution screens or displayed in a large area.

According to various embodiments, an electronic device 410 may comprise a flexible display 460 and at least one processor 420. The at least one processor 420 may include various processing circuitry and be configured to control the display display an execution screen of a first application in a first area of the display in a first position state, expand the display to include the first area and a second area, in response to a switch from the first position state to a second position state, display, in the second area, at least one object representing an executable application based on application attribute information, as the display is expanded, and display, on the expanded display, the execution screen of the first application along with an execution screen of an application corresponding to the selected object, in response to selection of any one of the at least one object.

According to various example embodiments, the at least one processor 420 may be configured to identify whether the first application is a resizable application based on attribute information for the first application, as the display is expanded.

According to various example embodiments, the at least one processor 420 may be configured to, based on the first application being the resizable application, identify at least one object representing the at least one executable application based on the application attribute information.

According to various example embodiments, the at least one processor 420 may be configured to, based on the first application not being the resizable application, control the display to display the execution screen of the first application on the expanded display in a compatibility mode.

According to various example embodiments, the at least one processor 420 may be configured to control the display to display the at least one identified object in the second area and, in response to a switch from the second position state to a third position state, display, on the expanded display, the execution screen of the first application along with the execution screen of the application corresponding to the selected object.

According to various example embodiments, the application attribute information may include at least one of a size adjustment attribute, a multi-instance attribute, a video attribute, a productivity category attribute, a frequently used application attribute, and a game attribute.

According to various example embodiments, the at least one processor 420 may be configured to control the display to display on the expanded display based on attribute information for the application corresponding to the selected object, attribute information for the first application, and priority, in response to selection of any one of the at least one object.

According to various example embodiments, the priority may be determined in an order of an application with a video attribute, an application with a game attribute, an application with a productivity category attribute, and an application with a frequently used application attribute.

According to various example embodiments, the first position state may be a state in which an exposed area of the display is smallest, and the third position state may be a state in which the exposed area of the display is largest.

According to various example embodiments, the at least one processor 420 may be configured to detect an operation of expanding the display in a state in which the first area of the display is exposed to an outside and expose at least a portion of the second area of the display to the outside according to the detection of the operation of expanding the display.

According to various example embodiments, the at least one processor 420 may be configured to, based on the entire second area of the display being exposed to the outside according to the detection of the operation of expanding the display, control the display to display the execution screen of the first application along with an execution screen further expanded than the execution screen of the application corresponding to the selected object.

Figure 5:
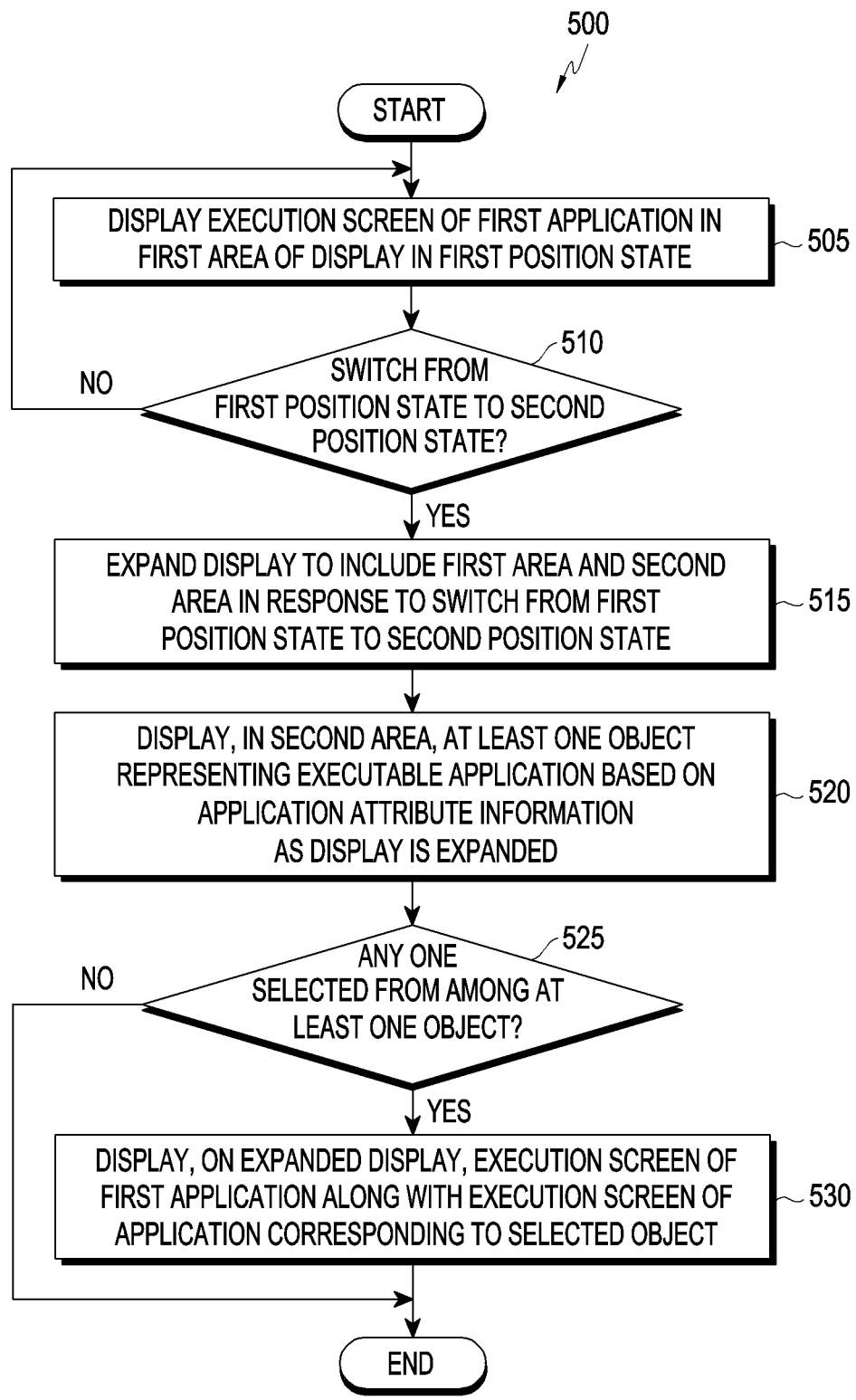
FIG. 5 is a flowchart illustrating an example operation for providing an application execution screen in an electronic device according to various embodiments.

FIG. 5 is a flowchart 500 illustrating an example operation for providing an application execution screen in an electronic device according to various embodiments.

Each step/operation of the operation method of FIG. 5 may be performed by at least one of an electronic device (e.g., the electronic device 101 of FIG. 1) or at least one processor (e.g., the processor 120 of FIG. 1 and the processor 420 of FIG. 4) of the electronic device. According to an embodiment, at least one of operations 505 to 530 may be omitted, some operations thereof may be performed in reverse order, or other operations may be added thereto.

In operation 505, the electronic device 401 may display an execution screen of a first application in a first area of a display (e.g., the display 460 of FIG. 4) in a first position state (e.g., the closed state). According to an embodiment, at least a portion of the display (e.g., the display 460 of FIG. 4) may be exposed to the outside through the housing of the electronic device 401. The first position state (e.g., closed state) may be a state in which a first portion (or first area) of the display is exposed to the outside. The first portion of the display exposed to the outside may be referred to as a first area.

In operation 510, the electronic device 401 may identify whether a switch is made from the first position state (e.g., the closed state) to a second position state (e.g., the partially opened state). According to an embodiment, as a user input for exposing a second portion including at least a portion of the first portion to the outside is received, in the exposed state of the first portion, the first position state of the electronic device 401 may switch to the second position state.

In response to the switch from the first position state to the second position state, in operation 515, the electronic device 410 may expand the display to include the first area and the second area. For example, as a user input for exposing the second portion including at least a portion of the first portion of the display to the outside is received, the display may be expanded so that the second portion including at least a portion of the first portion of the display is exposed to the outside. Accordingly, the expanded display may include the second area together with the first area. For example, the second portion exposed to the outside by the sliding distance according to the user input may be referred to as a second area, and the second area may be referred to as a quick panel or an edge area.

In operation 520, as the display is expanded, the electronic device 401 may display, in the second area, at least one object representing an executable application based on application attribute information.

In operation 525, the electronic device 401 may identify which any one of the at least one object is selected.

In operation 530, in response to selection of any one of the at least one object, the electronic device 401 may display, on the expanded display, the execution screen of the first application together with the execution screen of the application corresponding to the selected object.

According to various example embodiments, a method for providing an execution screen of an application by an electronic device may comprise: displaying an execution screen of a first application in a first area of a flexible display in a first position state, expanding the display to include the first area and a second area, in response to a switch from the first position state to a second position state, displaying, in the second area, at least one object representing an executable application based on application attribute information, as the display is expanded, and displaying, on the expanded display, the execution screen of the first application along with an execution screen of an application corresponding to the selected object, in response to selection of any one of the at least one object.

According to various example embodiments, the method may further comprise identifying whether the first application is a resizable application based on attribute information for the first application, as the display is expanded.

According to various example embodiments, the method may further comprise, based on the first application being the resizable application, identifying at least one object representing the at least one executable application based on the application attribute information.

According to various example embodiments, displaying the execution screen of the first application along with the execution screen of the application corresponding to the selected object may include, based on selection for any one of the at least one object being detected, in response to a switch from the second position state to a third position state, displaying, on the expanded display, the execution screen of the first application along with the execution screen of the application corresponding to the selected object.

According to various example embodiments, the application attribute information may include at least one of a size adjustment attribute, a multi-instance attribute, a video attribute, a productivity category attribute, a frequently used application attribute, and a game attribute.

According to various example embodiments, displaying the execution screen of the first application along with the execution screen of the application corresponding to the selected object may include displaying on the expanded display based on attribute information for the application corresponding to the selected object, attribute information for the first application, and priority, in response to selection of any one of the at least one object.

According to various example embodiments, the priority may be determined in an order of an application with a video attribute, an application with a game attribute, an application with a productivity category attribute, and an application with a frequently used application attribute.

According to various example embodiments, the method may further comprise detecting an operation of expanding the display in a state in which the first area of the display is exposed to an outside and exposing at least a portion of the second area of the display to the outside according to the detection of the operation of expanding the display.

Figure 6:
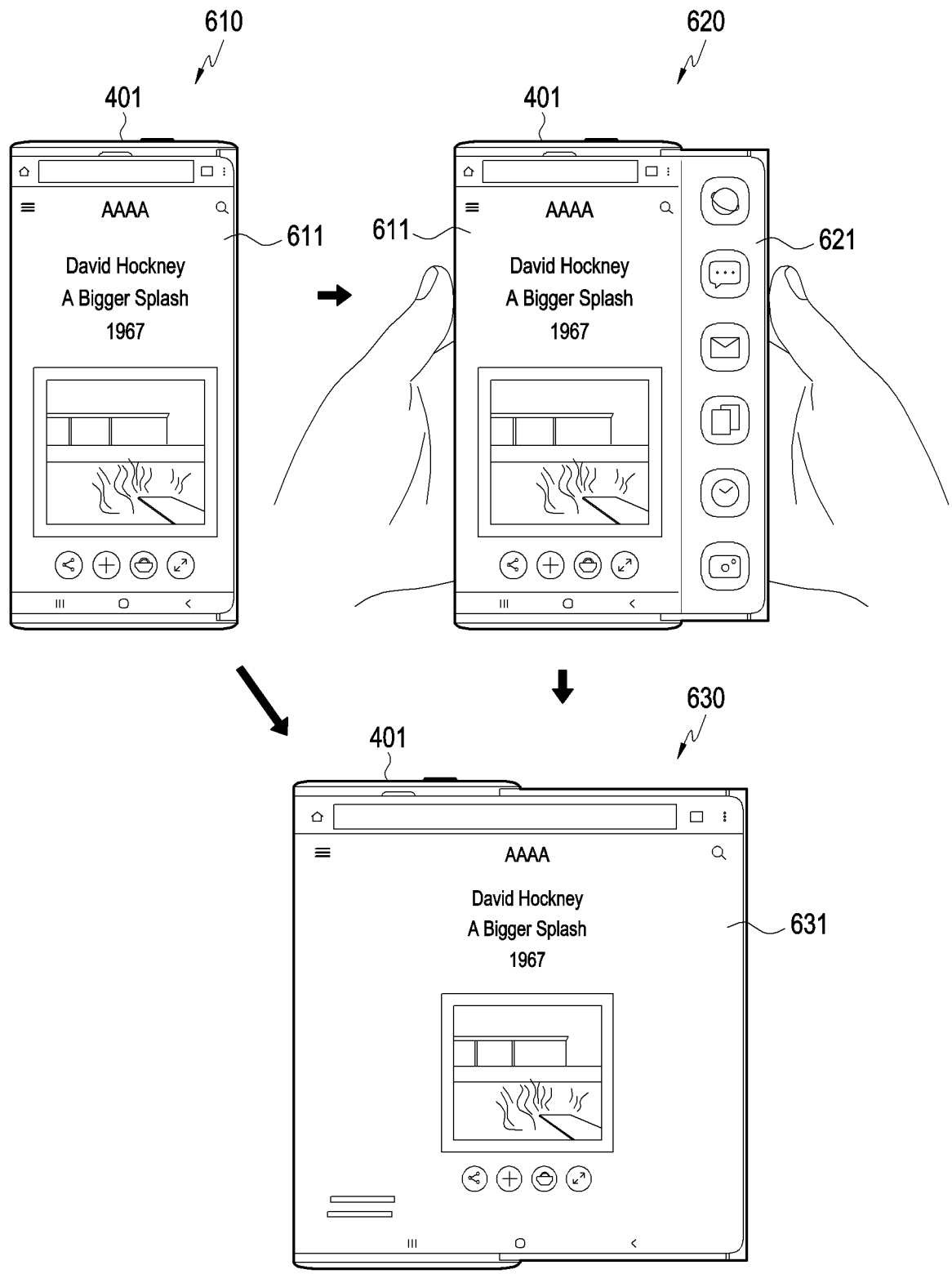
FIG. 6 is a diagram illustrating an example method for controlling screen display according to a sliding operation, according to various embodiments.

FIG. 6 is a diagram illustrating an example method for controlling screen display according to a sliding operation, according to various embodiments.

Referring to FIG. 6, an electronic device 401 including a flexible display may display a first screen in a first portion (or first area) 611 of the flexible display in a first position state 610. According to an embodiment, the first position state 610 may be a state in which the first portion 611 of the flexible display is exposed to the outside, and may be a closed state in which the exposed portion is the smallest. According to an embodiment, while at least one application is running, the first screen displayed in the first portion 611 may be the execution screen of the at least one running application. Otherwise, if there is no running application, the first screen may be a home screen.

According to an embodiment, the display may be changed from the first position state 610 to the second position state 620 according to a partial sliding operation (e.g., a partial sliding input) by the user and, in response thereto, at least a portion (or second area) 621 of the second portion of the display may be exposed to the outside. At least the portion 621 of the second portion of the display may be a portion continuous from the first portion 611 exposed to the outside. In response to the sliding operation for exposing the second portion 621 continuous from the first portion 611 of the display, at least a portion of the second portion 621 of the display may be exposed to the outside. An object representing at least one executable application may be displayed in the second portion 621 based on application attribute information. According to an embodiment, the second portion 621 may be referred to as a quick panel (or an edge area), and the electronic device 401 may receive a selection input for at least one object on the quick panel.

According to an embodiment, the display of the electronic device 401 may be changed from the first position state 610 to the third position state 630 according to a sliding operation (e.g., a full sliding input) for expansion by the user. Alternatively, the display of the electronic device 401 may be changed from the second position state 620 to the third position state 630. As described above, the electronic device 401 may continue the sliding operation even after exposing a portion of the display, e.g., a portion of the second portion, thereby exposing the entire second portion of the display to the outside.

For example, the entire second portion of the display may be exposed to the outside according to a continuous sliding operation (e.g., a full sliding input) without stopping in the first position state 610. In this case, in response to the continuous sliding motion without stopping, the electronic device 401 may expand and display the first screen, which used to be displayed in the first portion 611, so as to correspond to the size of the entire expanded display area immediately without displaying the quick panel. According to an embodiment, the entire second portion of the display may indicate one further expanded than the second portion 621 in the second position state 620 according to the sliding operation.

As described above, according to a sliding operation (e.g., a full sliding input) to expand the display, the display may be expanded to include the first portion 611 and the entire second portion in the third position state 630. According to an embodiment, the electronic device 401 may display the second screen in the entire display area 631 including the portion expanded according to the sliding operation. According to an embodiment, the second screen displayed in the entire area 631 may be an expanded screen of the first screen. For example, if the application being executed in the first position state 610 is a resizable application, the first screen which used to be displayed in the first portion 611 may be expanded and displayed to correspond to the size of the entire area. Alternatively, in a case where a selection for at least one object displayed in the second portion in the second position state 620 is not input, an expanded screen of the first screen corresponding to the size of the entire area 631 including the first portion 611 and the entire second portion may be displayed according to a sliding operation for expansion.

Figure 7:
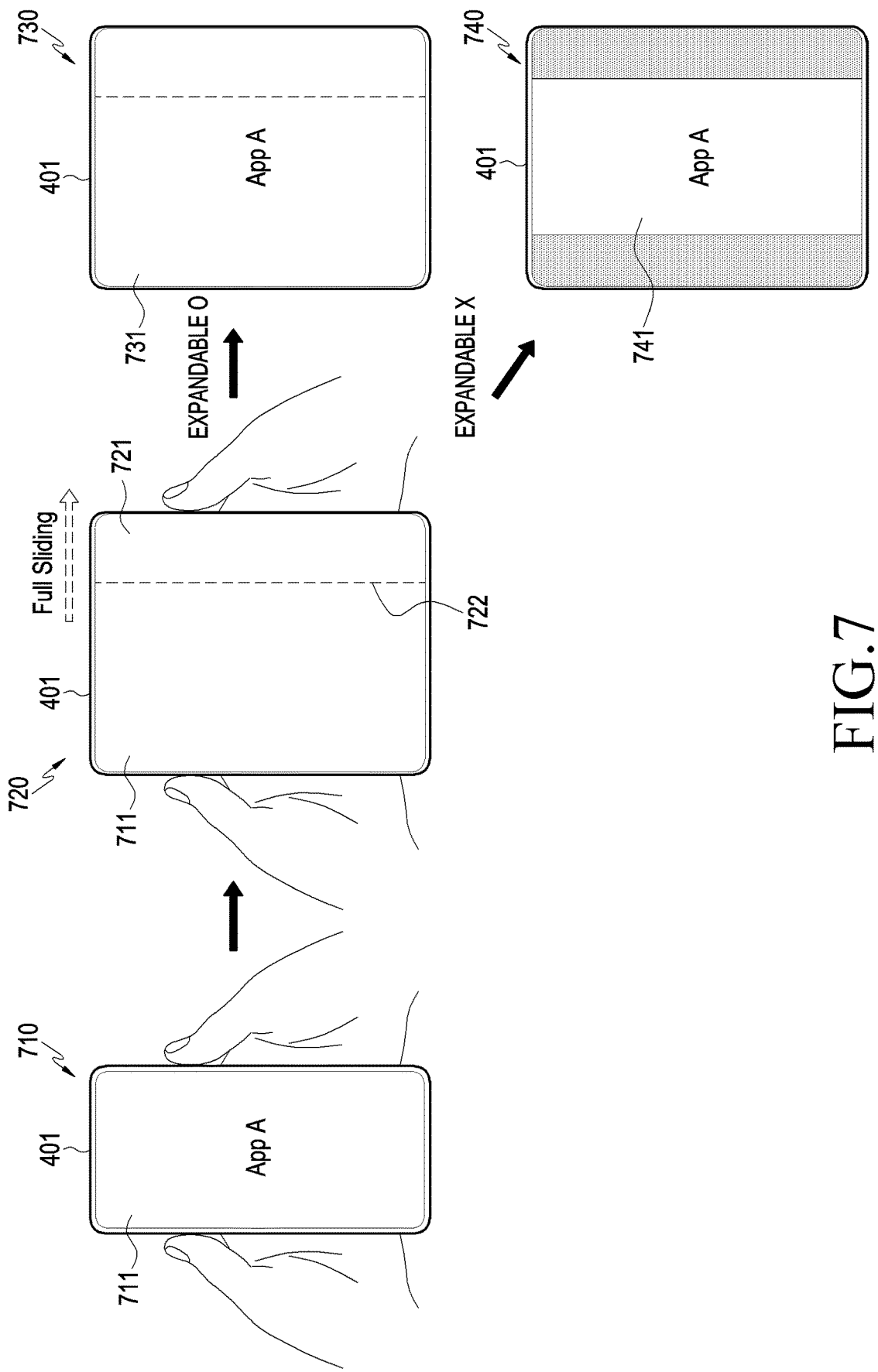
FIG. 7 is a diagram illustrating an example screen display for each sliding operation according to various embodiments.

FIG. 7 is a diagram illustrating example screen display for each sliding operation according to various embodiments.

According to an embodiment, as illustrated in 710 of FIG. 7, the electronic device 401 may control to display the execution screen of the application (e.g., application A) on the first portion 711 of the display in the closed state. According to an embodiment, as illustrated in 720 of FIG. 7, the electronic device 401 may detect an event of sliding the display in the right direction to expand the display from the closed state to the opened state.

According to an embodiment, the electronic device 401 may expand the display so that the area of at least a portion 721 of the display is maximally exposed to the outside according to a sliding operation (e.g., a full sliding input), and at least the portion 721 may be continuous from the first portion 711. The electronic device 401 according to an embodiment may control to maximize the exposed portion with respect to a reference axis (or a preset virtual reference line 722) according to a sliding operation (e.g., a full sliding input). According to an embodiment, if the sliding operation is detected, the electronic device 401 may identify whether the application is an expandable application based on attribute information for the currently running application. If the application is an expandable application, the electronic device 401 may display the execution screen of the application (e.g., application A) expanded to correspond to the entire display area 731, as illustrated in 730 of FIG. 7.

If the application is not an expandable application based on attribute information for the currently running application, the electronic device 401 may control to only display a screen 741 corresponding to the execution screen of the application (e.g., application A) as illustrated in 740 of FIG. 7. For example, as illustrated in 740 of FIG. 7, the electronic device 401 may display the execution screen of the application (e.g., application A) in a compatibility mode.

Figure 8A:
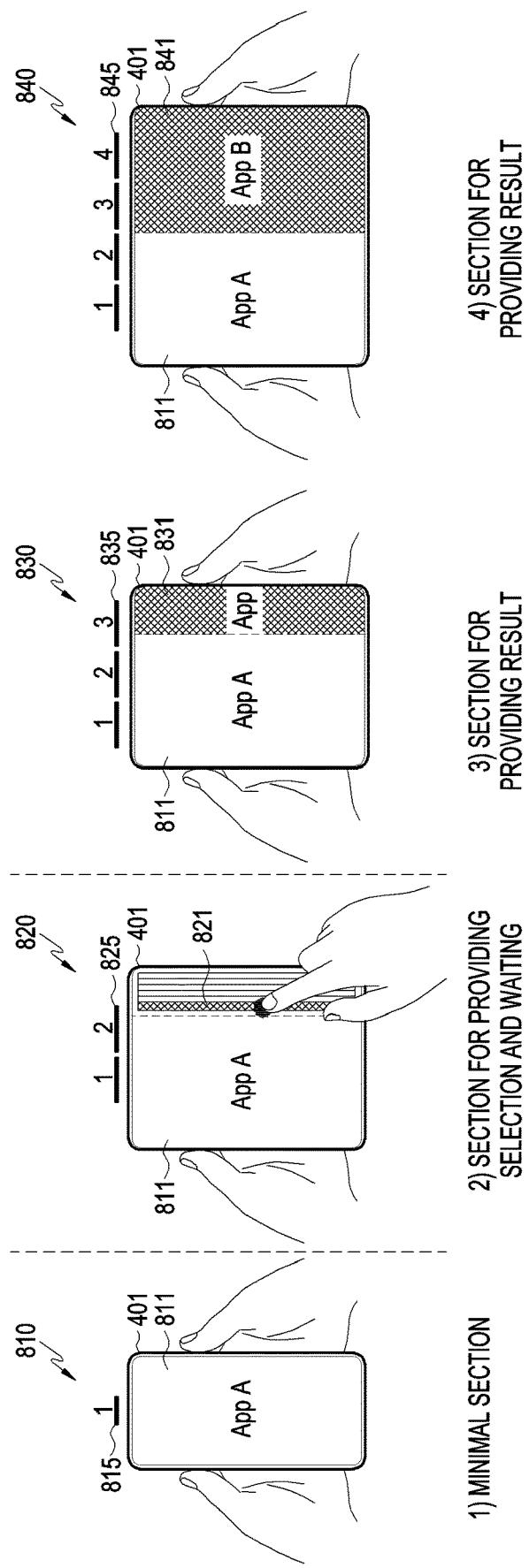
FIG. 8A is a diagram illustrating an example state for each screen width section according to various embodiments.

FIG. 8A is a diagram illustrating an example state for each screen width section according to various embodiments.

Referring to FIG. 8A, if the screen width in a state in which the entire area of the flexible display is exposed to the outside is referred to as n, the width of the entire screen may be split into a plurality of sections. FIG. 8A illustrates an operation state for each section when the entire screen is split into four sections.

According to an embodiment, as illustrated in 810 of FIG. 8A, a first section 815 may represent a section having a minimum size before the display of the electronic device 401 is expanded. When the first portion exposed to the outside of the display corresponds to the first section 815, the electronic device 401 may display the execution screen of at least one application in the first portion 811. In response to a sliding operation for exposing at least a portion of the second portion of the display to the outside while the first portion 811 is exposed, if the size of at least a portion of the exposed second portion (or the width of the exposed second portion) corresponds to a second section 825, the second section 825 may be defined as a section for waiting while providing the user's selection. For example, as illustrated in 820 of FIG. 8A, in the second section 825, the electronic device 401 may provide at least one object, such as an application or a menu for receiving a user selection input, in at least a portion 821 of the second portion and may wait for a certain period of time to receive a selection for any one.

If a selection for any one object provided in at least the portion 821 of the second portion is received, the electronic device 401 may provide a result corresponding to the selected object, along with the execution screen, on the first portion 811 as illustrated in 830 of FIG. 8A. For example, if at least a portion of the second portion 821 is expanded to the size corresponding to the third section 835 according to a sliding operation for expansion, the electronic device 401 may display an application execution screen corresponding to the selected object in the expanded second portion 831 as illustrated in 830 of FIG. 8A.

According to an embodiment, if the display is expanded to a size corresponding to the fourth section 845 in response to a sliding operation for exposing the entire second portion 821, the electronic device 401 may display the execution screen of the running application in the first portion 811, along with the application execution screen corresponding to the selected object in the expanded second portion 841, as illustrated in 840 of FIG. 8A.

Figure 8B:
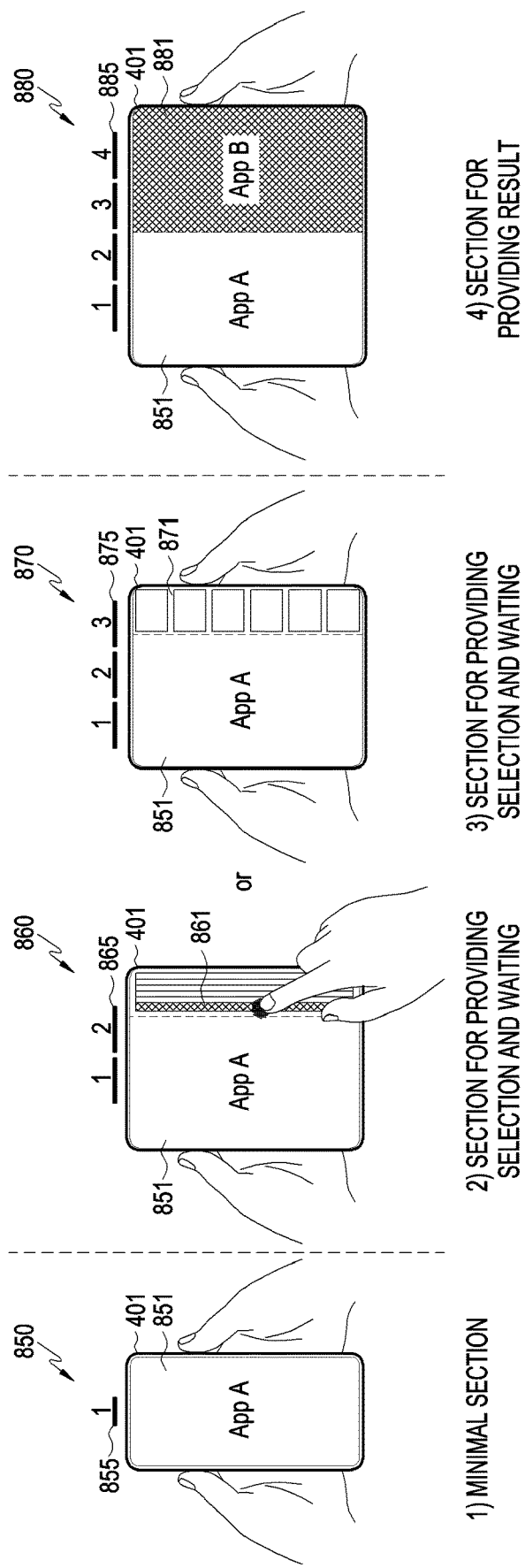
FIG. 8B is a diagram illustrating an example state for each screen width section according to various embodiments.

FIG. 8B is a diagram illustrating an example state for each screen width section according to various embodiments.

As illustrated in 850 of FIG. 8B, when the first portion exposed to the outside of the display corresponds to the first section 855, the electronic device 401 may display the execution screen of at least one application in the first portion 851.

If the width of the portion exposed in response to a sliding operation for exposing at least a portion of the second portion of the display to the outside while the first portion 851 is exposed reaches the second section 865, the application execution screen may be displayed in the first portion 851, and a screen for receiving the user's selection for the application may be displayed in at least a portion 861 of the second portion as illustrated in 860 of FIG. 8B. Further, in response to the continuous sliding operation for exposing at least a portion of the second portion of the display to the outside, if the width of the exposed portion reaches the third section 875, the size of at least a portion 871 of the second portion may also vary as illustrated in 870 of FIG. 8B so that the at least one object may be provided in a different layout form or preview form.

Further, if the width of the portion exposed in response to a sliding operation reaches the fourth section 885 as illustrated in 880 of FIG. 8B, that is, if the entire second portion 881 of the display is exposed, the electronic device 401 may display an application execution screen corresponding to the selected object in the entire second portion 881 and keep displaying the execution screen of the running application in the first portion 851.

According to an embodiment, whether to reach any one of the first to fourth sections in response to the sliding operation may be determined depending on the distance at which the display is expanded or contracted in one direction. For example, if the display is slid by the extension distance d in the right direction with respect to the reference axis, the display may be expanded by the extension area corresponding to the extension distance d. The electronic device 401 according to an embodiment may identify how much the display is expanded or contracted using the amount of rotation of the roller according to the sliding operation.

Figure 9:
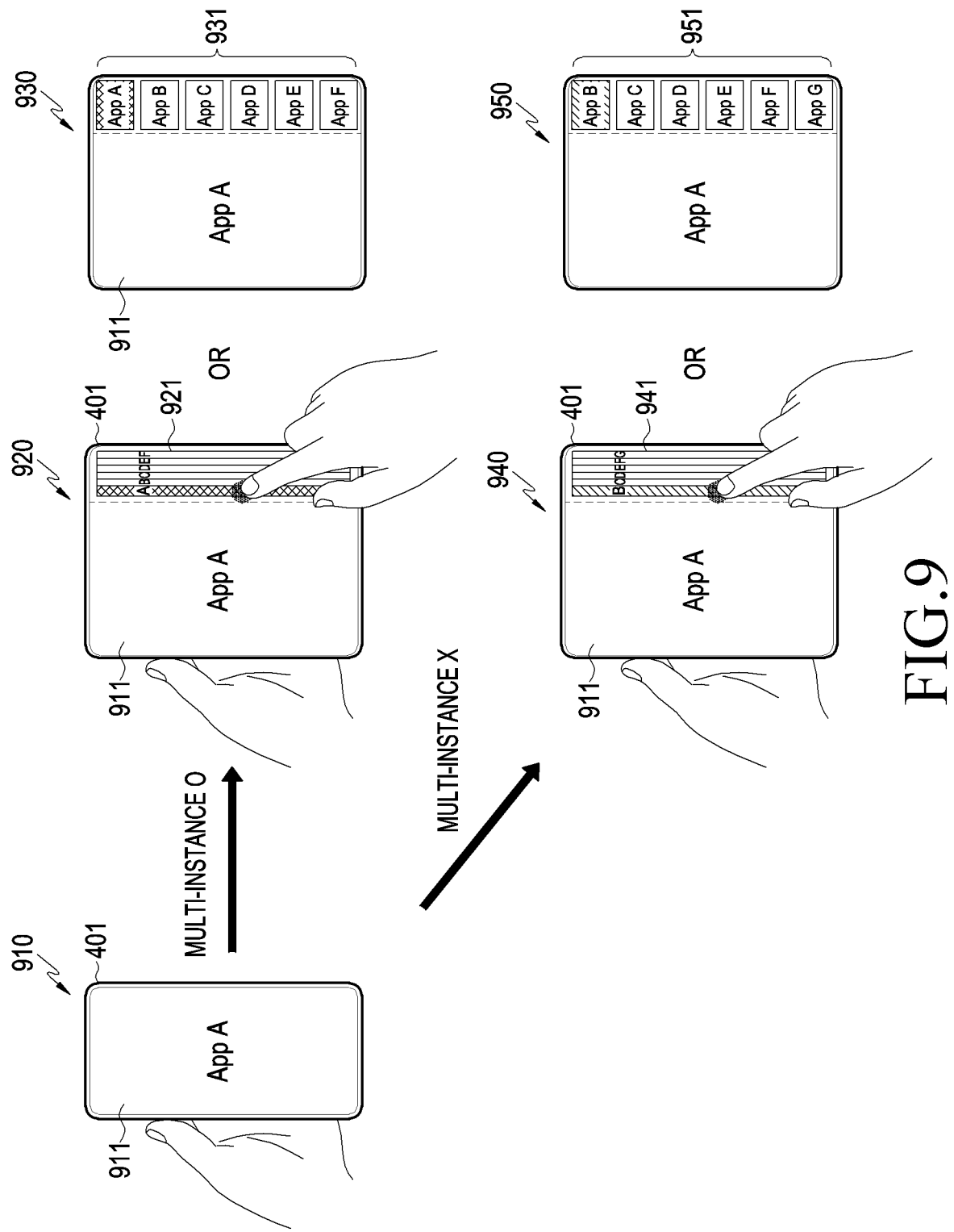
FIG. 9 is a diagram illustrating an example screen display method according to whether multi-instance is possible, according to various embodiments.

FIG. 9 is a diagram illustrating an example screen display method according to whether multi-instance is possible, according to various embodiments.

Referring to FIG. 9, the electronic device 401 may determine a scheme for displaying objects corresponding to the currently running application and a plurality of candidate applications, based on application attribute information. According to an embodiment, the electronic device 401 may identify whether the currently running application is an application that may be executed simultaneously with other applications based on attribute information for the currently running application. As such, an application having such attribute information that it may be executed simultaneously with another application may be referred to as a multi-instance application. The attribute information indicating a multi-instance application is unique attribute information possessed by the application, and such an application may include an email application and a message application.

As illustrated in 910 of FIG. 9, if a sliding operation for expansion is detected while the execution screen 911 of the first application (e.g., application A) is displayed on the electronic device 401, it may be identified whether the first application is a multi-instance application based on the attribute information for the first application.

If the first application is a multi-instance application, the electronic device 401 may display at least one graphic object representing a plurality of candidate applications to be displayed in the area 921 expanded by the sliding distance according to the sliding operation as illustrated in 920. In this case, the electronic device 401 may display a list 921 like the spines of books as illustrated in 920 or may display a plurality of graphic objects 931 as illustrated in 930. In this case, the electronic device 401 may also include and provide an object representing the same application as the currently running application. For example, if the object representing the same application as the running application is provided, the user may execute a new Internet application in a new window while the Internet application is running.

According to an embodiment, the electronic device 401 may determine a plurality of candidate applications based on application attribute information. For example, the electronic device 401 may determine the plurality of candidate applications based on attribute information including at least one of a multi-instance application, an application having a video attribute, an application having a productivity category attribute, an application having a frequently used application attribute, and an application having a game attribute.

Meanwhile, if the first application is not a multi-instance application, the electronic device 401 may provide objects representing the remaining candidate applications except for the running application in the area 941 extended by the sliding distance according to the sliding operation as illustrated in 940 or 950. In this case, the electronic device 401 may display a list 941 for the remaining candidate applications except for the running application like the spines of books or may display them using a plurality of graphic objects 951 as illustrated in 950.

Figure 10:
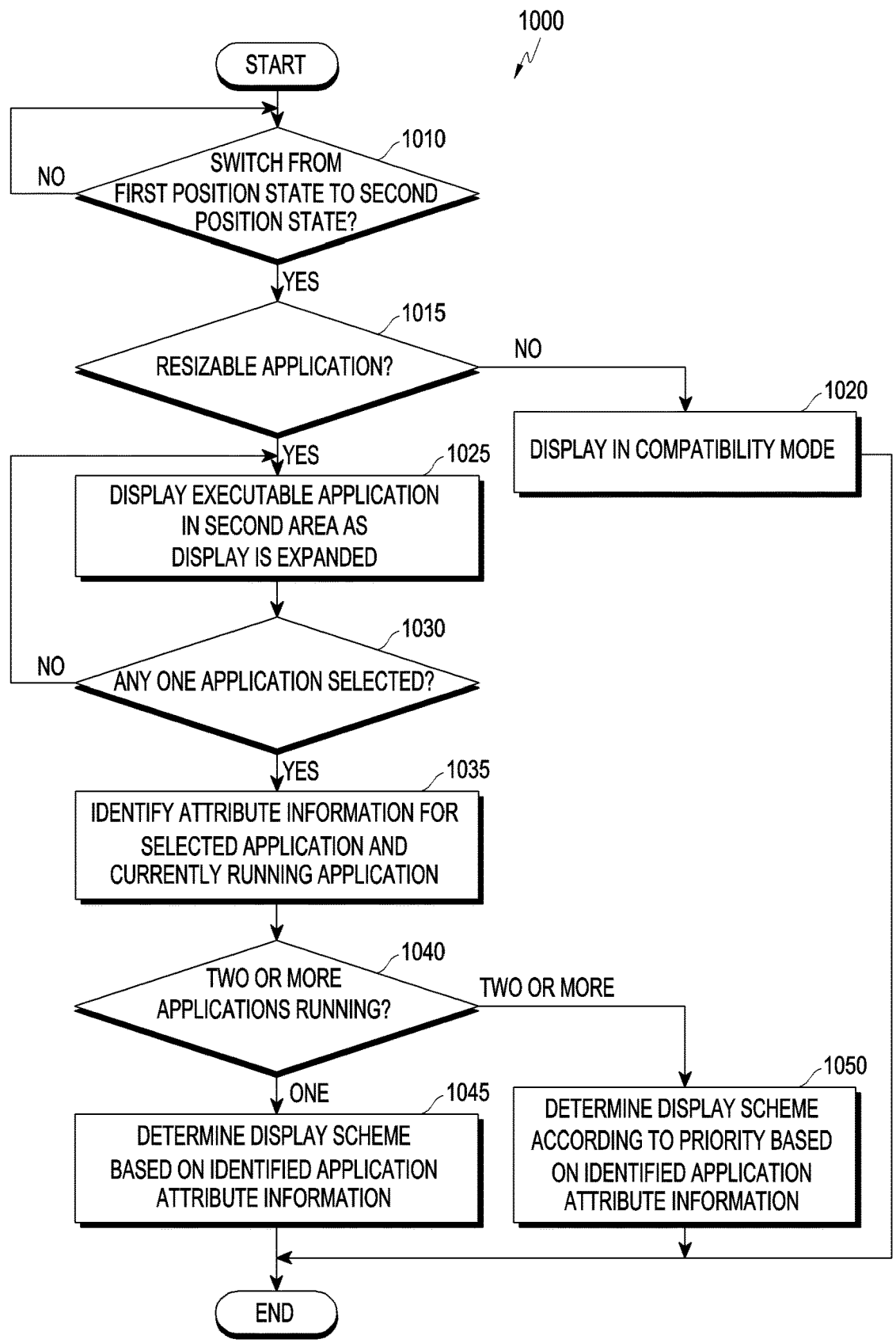
FIG. 10 is a flowchart illustrating an example operation for controlling screen display based on application attribute information, according to various embodiments.

FIG. 10 is a flowchart 1000 illustrating an example operation for controlling screen display based on application attribute information, according to various embodiments.

Referring to FIG. 10, in operation 1010, the electronic device 401 may identify whether a switch is made from a first position state to a second position state.

In operation 1015, the electronic device 401 may identify whether the currently running application is a resizable (or expandable) application. According to an embodiment, the electronic device 401 may identify whether the application is a resizable application based on attribute information for the currently running application. For example, each application has its own application attribute information. If the application attribute information is set as resizable, e.g., 'resizability=true,' the electronic device may identify that the application is a resizable application.

If the application is not a resizable application, the electronic device 401 may display it in the compatibility mode in operation 1020. For example, as illustrated in 740 of FIG. 7, the electronic device 401 may display the execution screen of the application (e.g., application A) in a compatibility mode.

If the currently running application is a resizable (or expandable) application, the electronic device 401 may display the executable application in the second area according to the expansion of the display in operation 1025. According to an embodiment, the electronic device 401 may display a plurality of candidate applications in at least a portion of the second area of the display exposed to the outside according to the display extension. For example, the plurality of candidate applications may be predetermined based on application attribute information.

When a selection for any one application is input in operation 1030, the electronic device 401 may identify attribute information for the selected application and the currently running application in operation 1035. According to an embodiment, if the currently running application is a resizable application, the application may have attribute information capable of multi-instance support.

In operation 1040, the electronic device 401 may identify whether two or more applications are running. If only one application is running, the electronic device 401 may determine a display scheme based on the identified application attribute information in operation 1045. The display scheme based on application attribute information is described in greater detail below with reference to FIGS. 11, 12, 13 and 14.

On the other hand, if two or more applications are running, the electronic device 401 may determine a display scheme according to priority based on the identified application attribute information in operation 1050. For example, the electronic device 401 may determine the priority based on attribute information for the selected application (e.g., game application) and the running application (e.g., application A or B). According to an embodiment, the priority may be determined, e.g., in the order of an application having the video attribute, an application having the game attribute, an application having the productivity category attribute, an application having the frequently used application attribute, and other applications. Accordingly, the electronic device 401 may display the execution screen of the application in a broader area among the areas divided in descending order of priority or may overlay and display it on the execution screen of another application.

Figure 11:
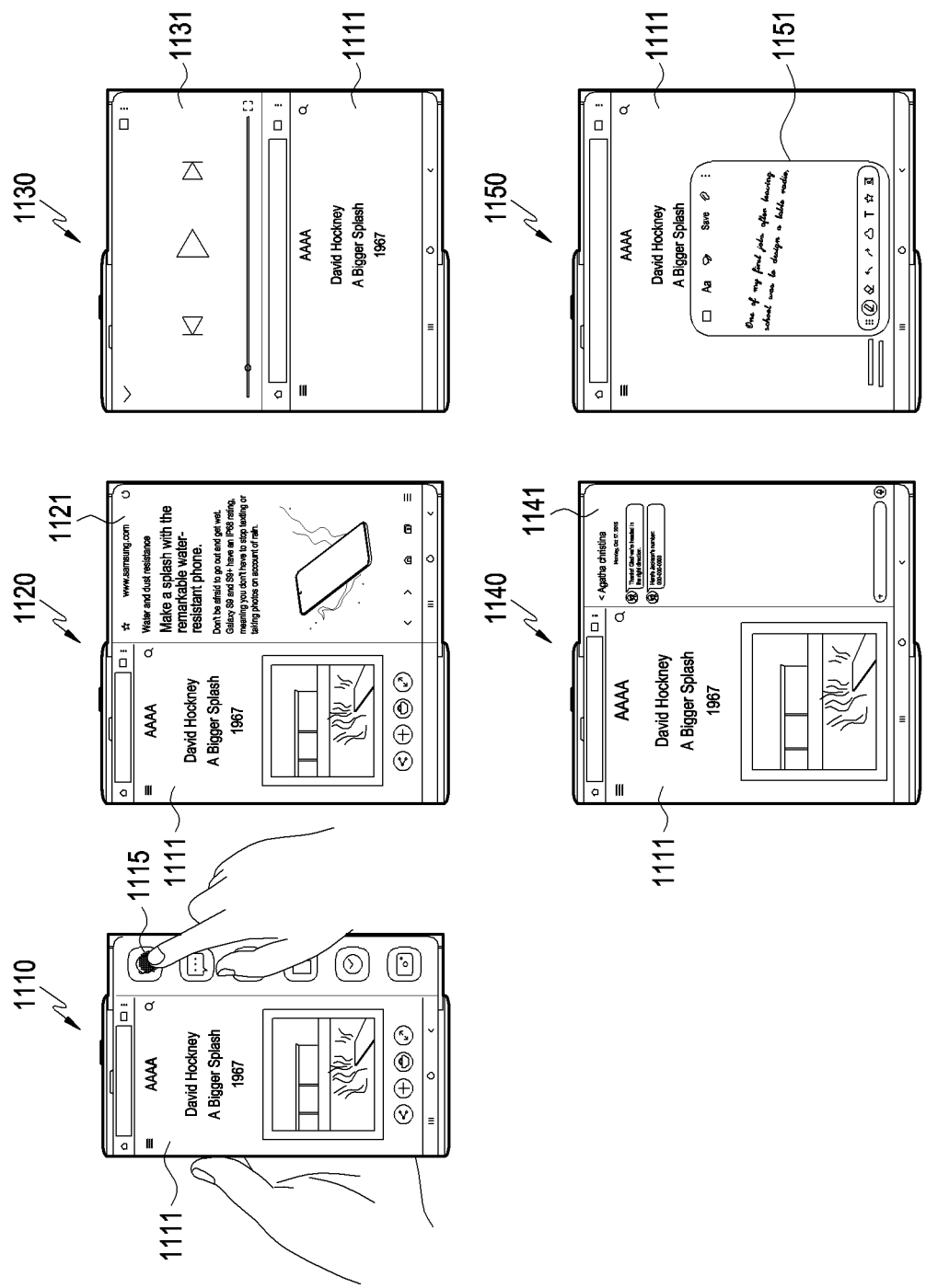
FIG. 11 is a diagram illustrating two-division screen display based on application attribute information, according to various embodiments.

FIG. 11 is a diagram illustrating an example two-split screen display based on application attribute information, according to various embodiments.

As illustrated in 1110 of FIG. 11, while the execution screen of a first application is displayed in a first portion 1111 of the display of the electronic device 401 according to a sliding operation for expansion, graphic objects representing a plurality of candidate applications based on application attribute information may be displayed in the expanded area. If a selection input 1115 for any one of the graphic objects representing the plurality of candidate applications is detected, the electronic device 401 may display the application execution screen corresponding to the selected object in the expanded portion 1121 according to the sliding operation as illustrated in 1120. In this case, the first application may be an application that is resizable and supports multi-instance. For example, if the first application is the same application (e.g., Internet application) as the application corresponding to the selected object, the electronic device 401 may the execution screen of the corresponding application in each of the areas into which the entire display area is split in the same size.

For example, if the first application is an Internet application, and the application corresponding to the selected object is an application with the video attribute 1131, it may be displayed as illustrated in 1130. For example, the execution screens of the applications may be displayed in the upper area and lower area of the reference line crossing the display to play content corresponding to the application with the video attribute 1131. In this case, since the application with the video attribute may have a higher priority than the Internet application, it may be disposed in the larger of two division areas.

For example, in a case where the first application is an Internet application, and the application corresponding to the selected object is a message application, it may be displayed as illustrated in 1140 if the frequently used application attribute information is used. For example, the electronic device 401 may control to dispose the execution screen of the more frequently used application in the larger area 1111 and the execution screen of the less frequently used application in the narrower area 1141.

For example, in a case where the first application is an Internet application, and the application corresponding to the selected object is a note application, if application attribute information with the priority of the productivity category attribute is used, the execution screen of the note application with the priority of the productivity category attribute may be displayed overlaid in a pop-up window 1151 while the execution screen of the Internet application is displayed in the entire display area 1111 as illustrated in 1150.

Figure 12:
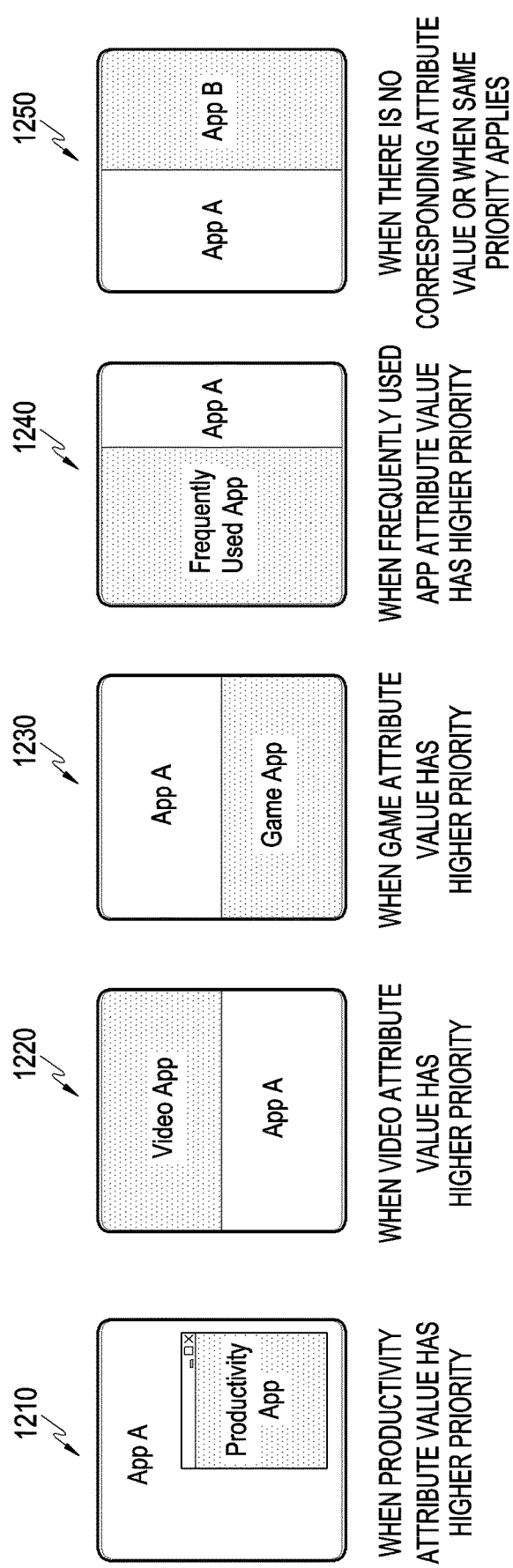
FIG. 12 is a diagram illustrating a two-division screen display scheme according to various embodiments.

FIG. 12 is a diagram illustrating an example two-division screen display scheme according to various embodiments. In a case where two or more applications are simultaneously displayed as illustrated in FIG. 12, they may be displayed in various manners based on application attribute information.

For example, if the productivity category attribute value has a higher priority, the execution screen of the application with higher priority may be disposed in the form of a pop-up window as illustrated in 1210. Further, as illustrated in 1220, if the video attribute value has a higher priority, the execution screens of the applications may be displayed in each of the upper area and the lower area of the reference line crossing the display. Similarly, as illustrated in 1230, if the game attribute value has a higher priority, the execution screens of the applications may be displayed in each of the upper area and the lower area of the reference line crossing the display. Further, as illustrated in 1240, if the frequently used application attribute value has a higher priority, the execution screen of the frequently used application may be first disposed in the larger area among the areas having different division sizes. As illustrated in 1250, if the application does not have an attribute corresponding to the application attribute information or the priorities between the applications are the same, the execution screens of the applications may be arranged in each area split into the same size by the default scheme.

Figure 13:
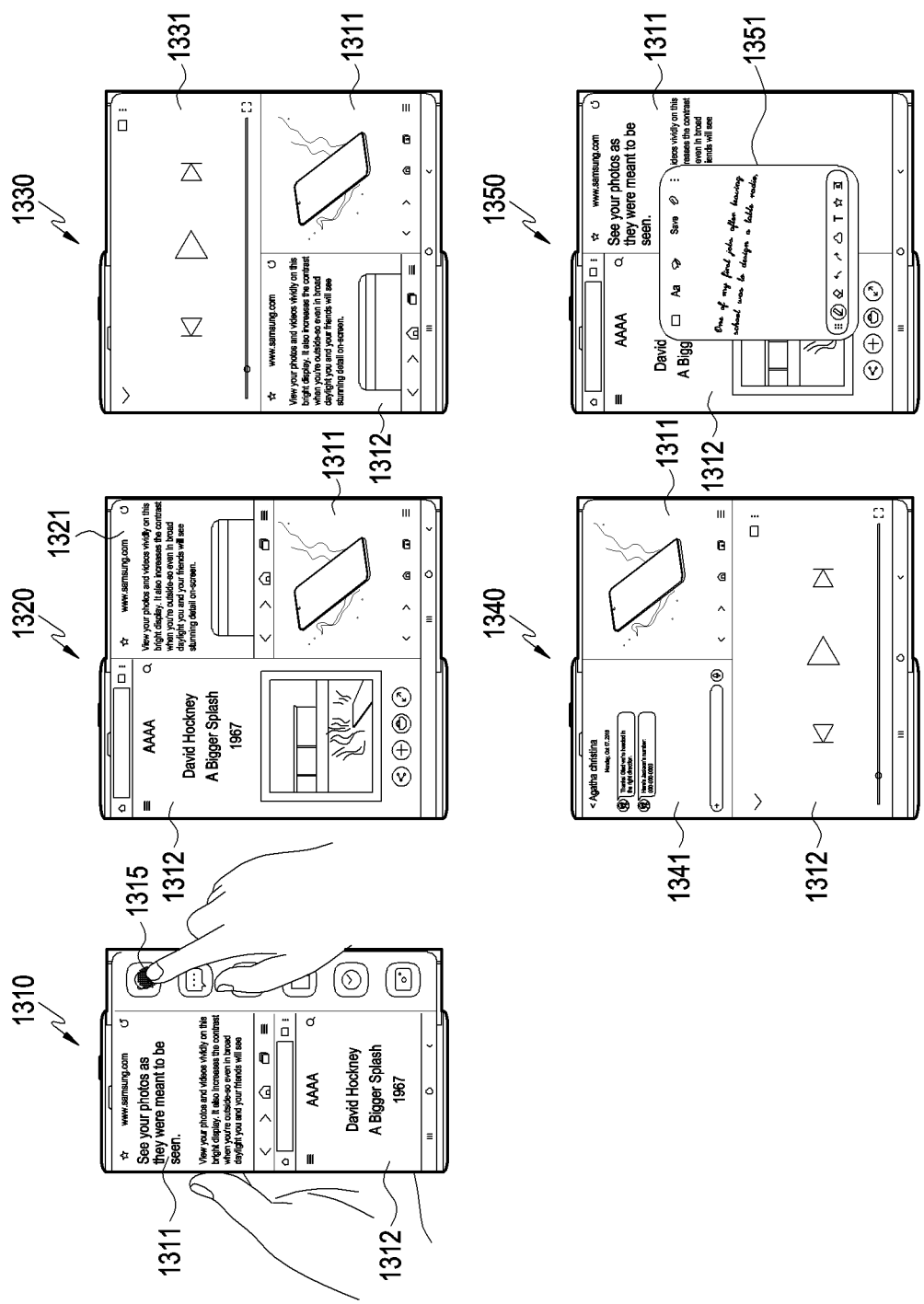
FIG. 13 is a diagram illustrating three-division screen display based on application attribute information, according to various embodiments.

FIG. 13 is a diagram illustrating an example three-division screen display based on application attribute information, according to various embodiments. Albeit similar to FIG. 11, FIG. 13 illustrates an example in which the execution screens 1311 and 1312 of two applications are displayed in the first area of the display.

As illustrated in 1310, while the execution screen of a first application and the execution screen of a second application are displayed in a first portion 1311 of the display of the electronic device 401 according to a sliding operation for expansion, graphic objects representing a plurality of candidate applications based on application attribute information may be displayed in the expanded area. If a selection input for any one graphic object 1315 is detected, the electronic device 401 may set three or more screen division areas in the entire screen of the display in response to the selection of the graphic object. For example, as illustrated in 1320, the entire display screen may be set to have a plurality of division areas 1311, 1312, and 1321, and the execution screens of the applications may be arranged in each of the division areas based on application attribute information.

For example, as illustrated in 1320, if a selection for executing a new Internet application is input while two Internet applications are running, the execution screens of the Internet application may be arranged in the respective division areas. On the other hand, as illustrated in 1330, if the application with the video attribute is selected while two Internet applications are running, the execution screen of the application with the video attribute may be disposed in the broadest, horizontal division area 1331, and the execution screens of the two Internet applications may be disposed in the respective remaining areas 1311 and 1312.

Further, as illustrated in 1340, if a message application is selected while two Internet applications are running, the execution screens of the applications may be arranged in each division area 1311, 1312, and 1341 based on the priority of frequent use. Further, as illustrated in 1350, if the application corresponding to the selected object is a note application, the execution screen of the note application may be preferentially displayed based on the priority of the productivity category attribute. For example, the execution screen of the note application may be disposed in the pop-up window 1351 and may be overlaid on the execution screens 1311 and 1312 of the other running Internet applications.

Figure 14:
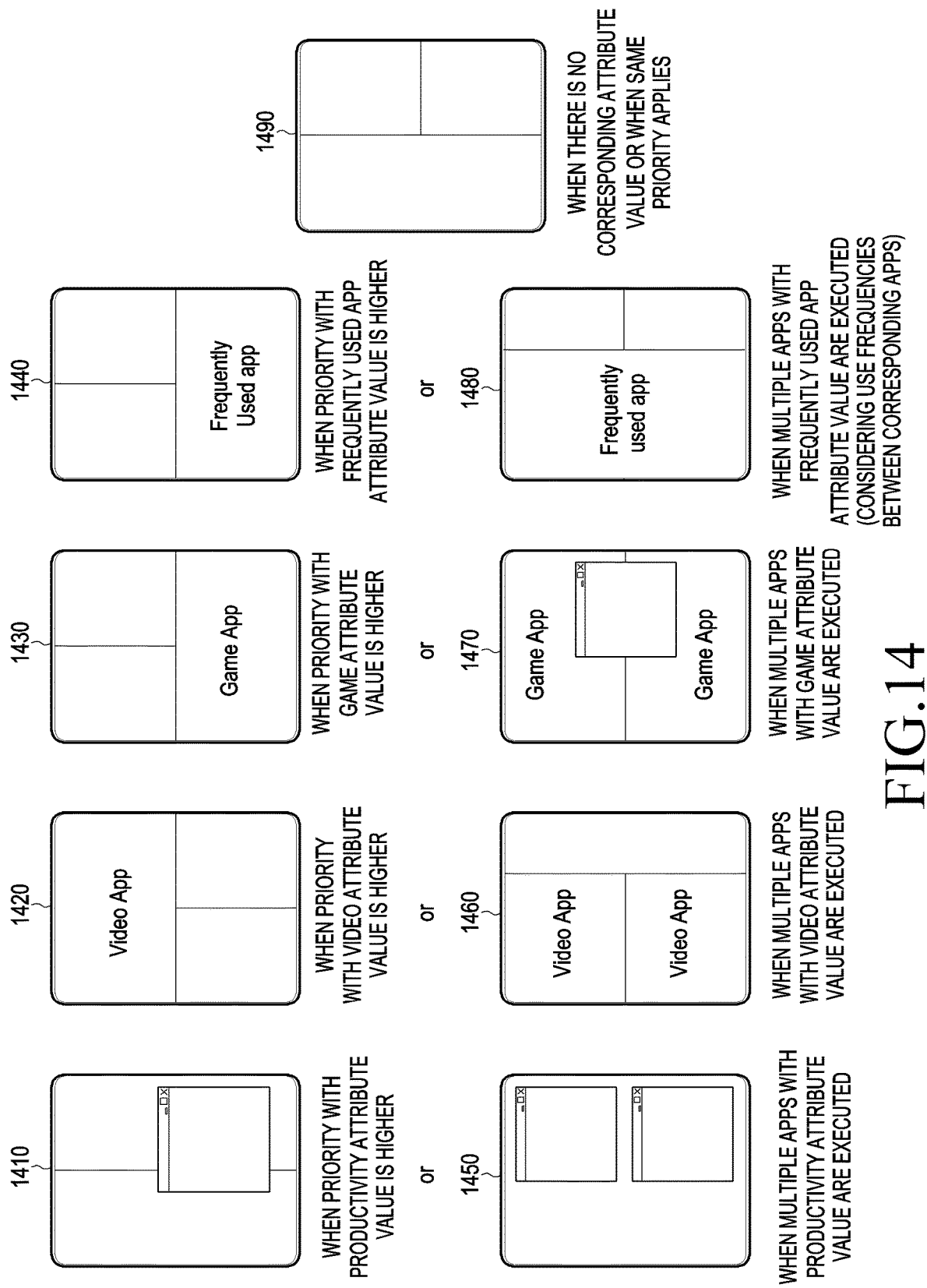
FIG. 14 is a diagram illustrating a three-division screen display scheme according to various embodiments.

FIG. 14 is a diagram illustrating an example three-division screen display scheme according to various embodiments. If three or more applications are simultaneously displayed as illustrated in FIG. 14, various display schemes 1410, 1420, 1430, 1440, 1450, 1460, 1470, 1480 to 1490 may be determined based on application attribute information, but display schemes may not be limited thereto.

Figure 15A:
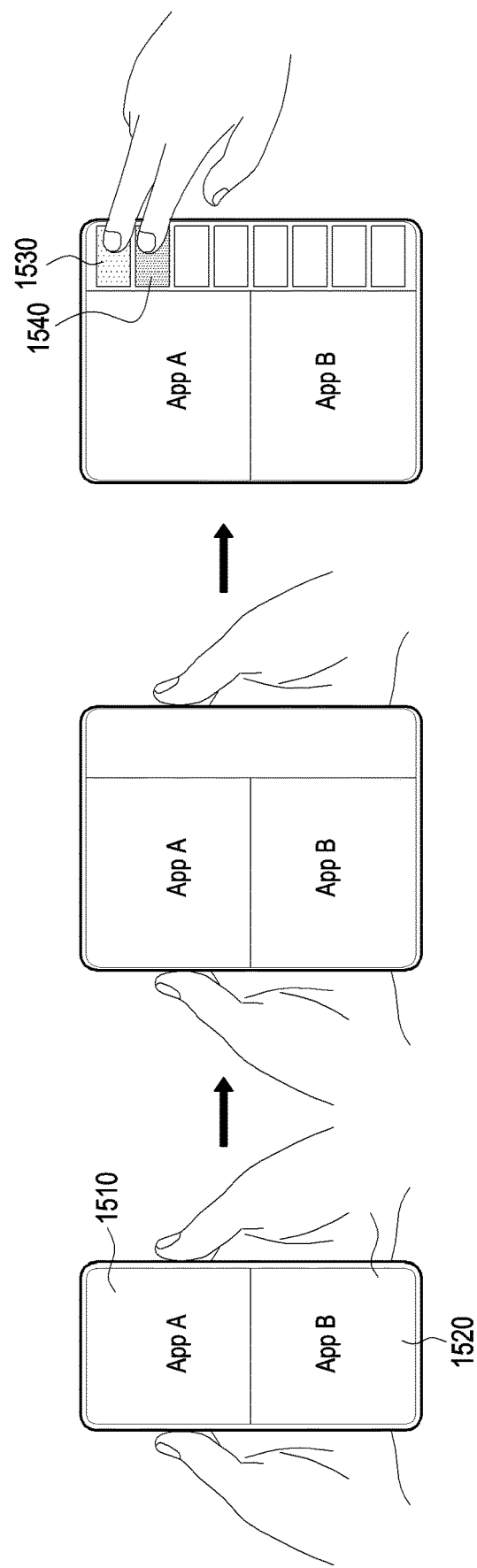
FIG. 15A is a diagram illustrating a multi-window screen scheme of three or more divisions, according to various embodiments.

FIG. 15A is a diagram illustrating an example multi-window screen scheme of three or more divisions, according to various embodiments.

Referring to FIG. 15A, the electronic device 401 may set a first area and a second area on the display and may display a graphic element related to a first application (e.g., application A) in the first area and a graphic element related to a second application (e.g., application B) in the second area. Accordingly, the electronic device 401 may simultaneously display the execution screen 1510 of the first application (e.g., application A) and the execution screen 1520 of the second application (e.g., application B) in the closed state of the display.

As described above, a sliding operation may be detected while the first application (e.g., application A) and the second application (e.g., application B) are running. In a case where the sliding operation is a partial sliding operation, in response to the sliding operation, the electronic device 401 may identify at least one executable application based on application attribute information in an area expanded by the sliding distance and may display at least one object representing the identified application in the expanded area. For example, if a user input for simultaneously selecting a plurality of objects 1530 and 1540 is detected, the electronic device may determine a display scheme based on attribute information for the running applications (e.g., applications A and B) and attribute information for the application corresponding to the selected object.

Figure 15B:
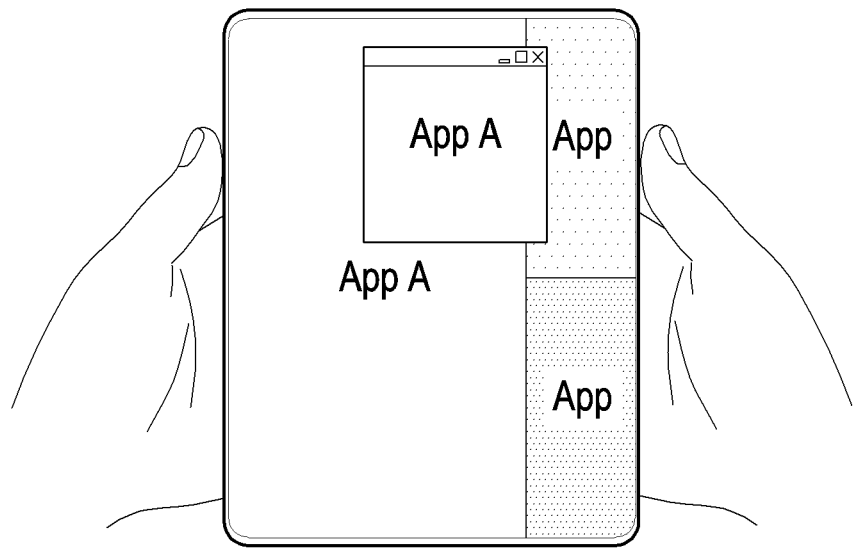
FIG. 15B is a diagram illustrating multi-window screen display of three or more divisions, according to various embodiments.
Figure 15C:
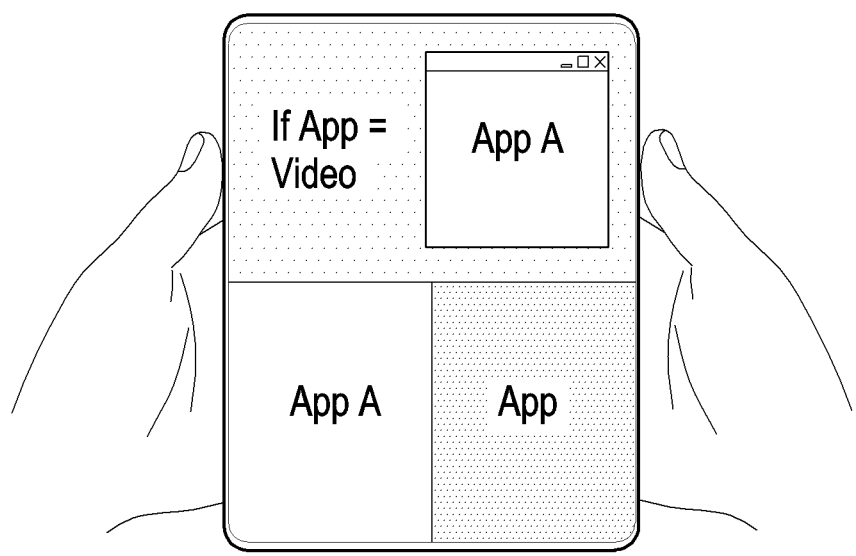
FIG. 15C is a diagram illustrating multi-window screen display of three or more divisions, according to other embodiments.

According to an embodiment, the electronic device 401 may arrange the respective execution screens (or execution windows) of the applications on the entire display area as illustrated in FIG. 15B or 15C. For example, in a case where the entire display screen is split into a plurality of areas, the electronic device 401 may adjust the window (or pop-up window) of each application to match each division area.

According to an embodiment, in a case where there are three or more division areas, the electronic device 401 may display at least one application in the form of a pop-up window as illustrated in FIG. 15B and 15C. For example, as illustrated in FIG. 15B, the window of at least one application may be displayed in an overlaid manner. In this case, for an application (e.g., video application) based on the application attribute information, the electronic device 401 may display the execution screen of the application in a larger areas among the division areas. For example, if there is an application with the video attribute based on attribute information for the running applications (e.g., applications A and B) and the attribute information for the application corresponding to the selected object, the electronic device 401 may display the execution screen of the application in an area larger than the other areas, e.g., an area having a proportion considering horizontal content characteristics.

Figure 16:
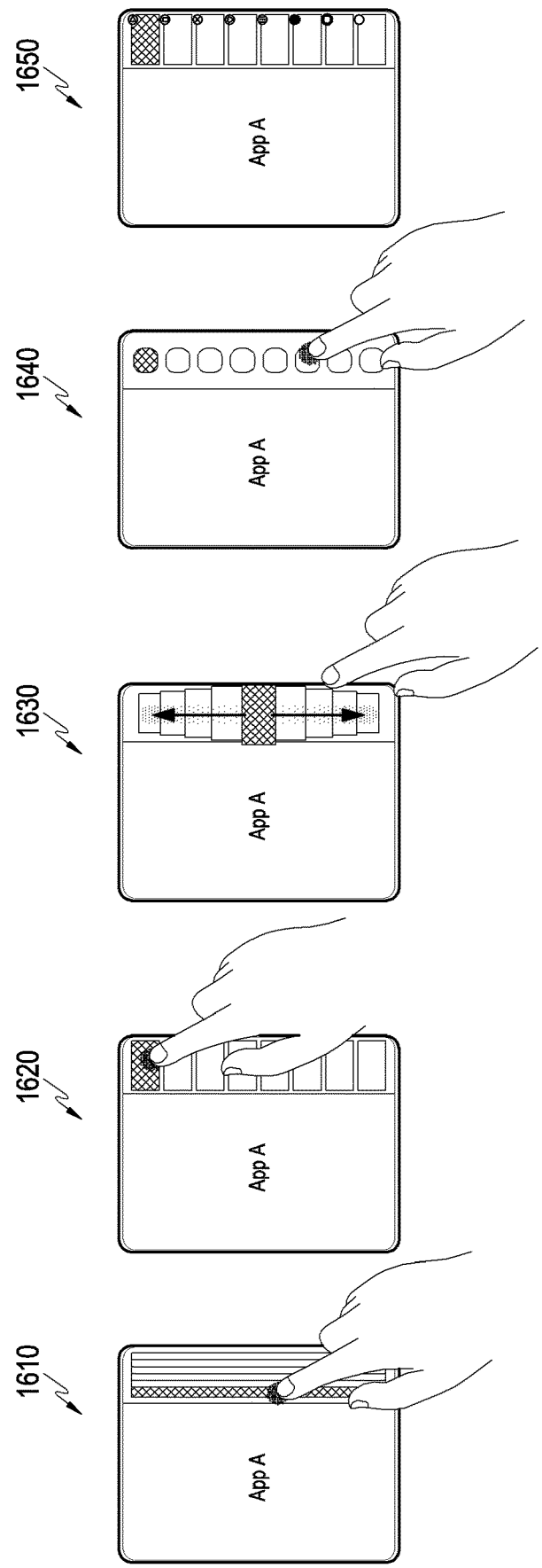
FIG. 16 is a diagram illustrating an option display scheme for a selection input, according to various embodiments.

FIG. 16 is a diagram illustrating an example option display scheme for a selection input, according to various embodiments. FIG. 16 illustrates an example scheme for displaying at least one graphic object displayed in an expanded area of a display in response to a sliding operation.

As illustrated in 1610 of FIG. 16, the electronic device 401 may display a list of at least one overlapping object. The at least one object may be a graphic object representing at least one executable application based on application attribute information. For example, the user may select a desired object from among the objects displayed like spines of books.

The electronic device 410 may arrange the at least one graphic object in the expanded area of the display in various fashions, such as tabs (or indexes) 1620, a searchable form 1630, icons 1640 representing applications, or displaying (1650) icons indicating the attributes of applications along with previews of the applications.

Figure 17:
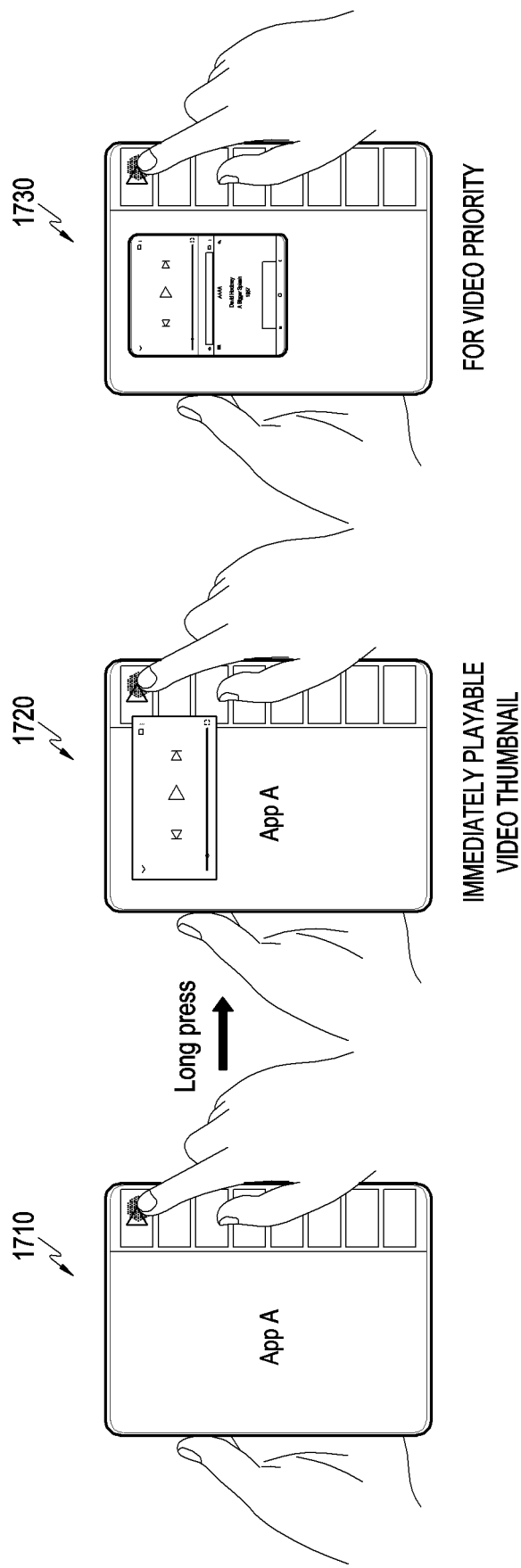
FIG. 17 is a diagram illustrating screen display when an object representing a first application is selected, according to various embodiments.

FIG. 17 is a diagram illustrating an example screen display when an object representing a first application is selected, according to various embodiments.

As illustrated in 1710 of FIG. 17, while a first screen is being displayed in a first area of the display, the electronic device 401 may control the display operation of the display by a slide operation. For example, in a state where the execution screen of an application is being displayed in the first area, the electronic device 401 may display at least one graphic object in the expanded area of the display in response to the sliding operation.

According to an embodiment, the electronic device 401 may identify a first input for an object corresponding to a first application among at least one graphic object. For example, the first input for the object corresponding to the first application may include a long press input. In response to the first input for the object corresponding to the first application, the electronic device 401 may provide thumbnail playback through the preview for the first application (e.g., video application) corresponding to the selected object as illustrated in 1720 of FIG. 17. For example, the electronic device 401 may immediately execute the first application (e.g., a video application) in response to the selection of the object.

According to an embodiment, the electronic device 401 may identify a second input for an object corresponding to the first application among at least one graphic object. For example, the second input for the object corresponding to the first application may include at least one of a double tap input and hovering. In response to the second input for the object corresponding to the first application, the electronic device 401 may display the first application (e.g., video application) corresponding to the selected object in a multi-window form (or a pop-up window form) as illustrated in 1730 of FIG. 17. In this case, if the running application (e.g., application A) has a higher priority than the first application (e.g., video application), the electronic device 401 may preferentially display the execution screen of the first application (e.g., video application) over the execution screen of the application (e.g., application A) as illustrated in 1730 of FIG. 17. As such, the electronic device 401 may provide an application in various fashions, such as previewing or immediate execution depending on the type of the input for the object.

Figure 18:
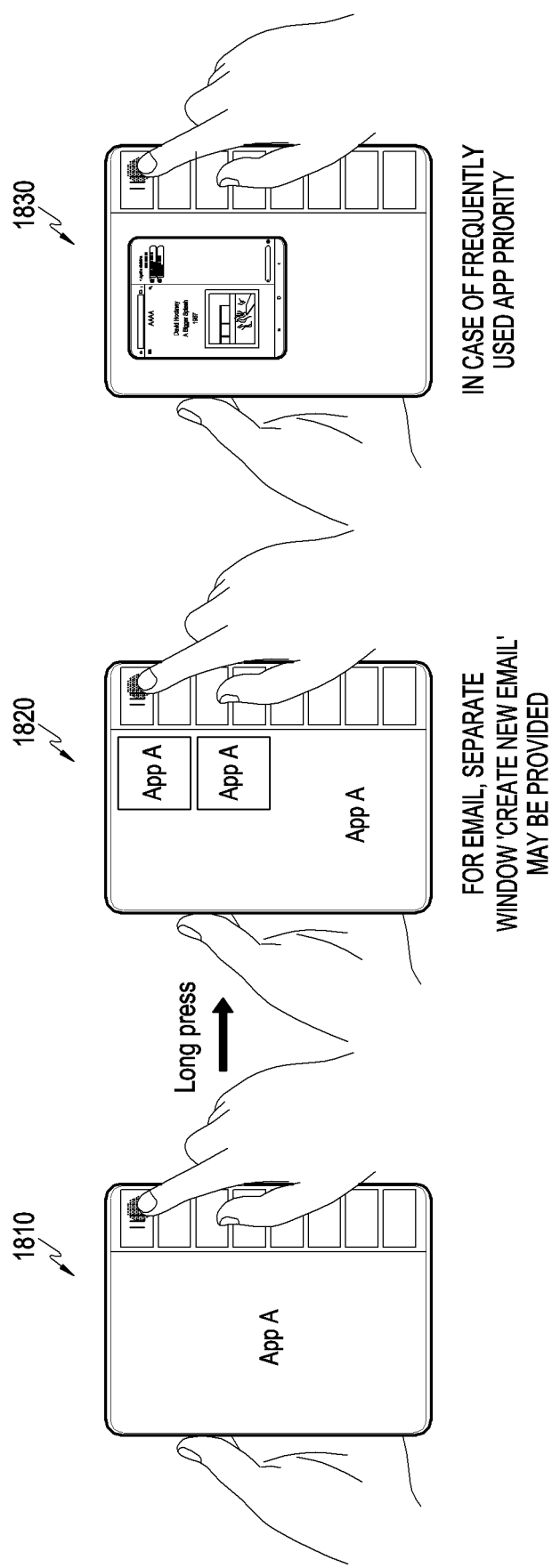
FIG. 18 is a diagram illustrating screen display when an object representing a second application is selected, according to various embodiments.

FIG. 18 is a diagram illustrating an example screen display when an object representing a second application is selected, according to various embodiments.

As illustrated in 1810 of FIG. 18, in a state in which at least one graphic object is displayed in the expanded area of the display in response to a sliding operation while a first screen is displayed in a first area of the display, the electronic device 401 may identify a first input for an object corresponding to a second application among at least one graphic object. If the second application is an email application, the electronic device 401 may provide a separate new window for a new email as illustrated in 1820 of FIG. 18. In contrast, the electronic device 401 may display the execution screen of the running application (e.g., application A) along with the execution screen of the second application corresponding to the object, with the frequently used application prioritized as illustrated in 1830 of FIG. 18, in response to a second input for the object corresponding to the second application among at least one graphic object. For example, the electronic device 401 may previously measure the use frequency of each application to determine the priorities of the frequently used applications and, in response to the selection, determine the priorities based on the use frequency of the second application (e.g., email application) and the running application (e.g., application A).

Figure 19:
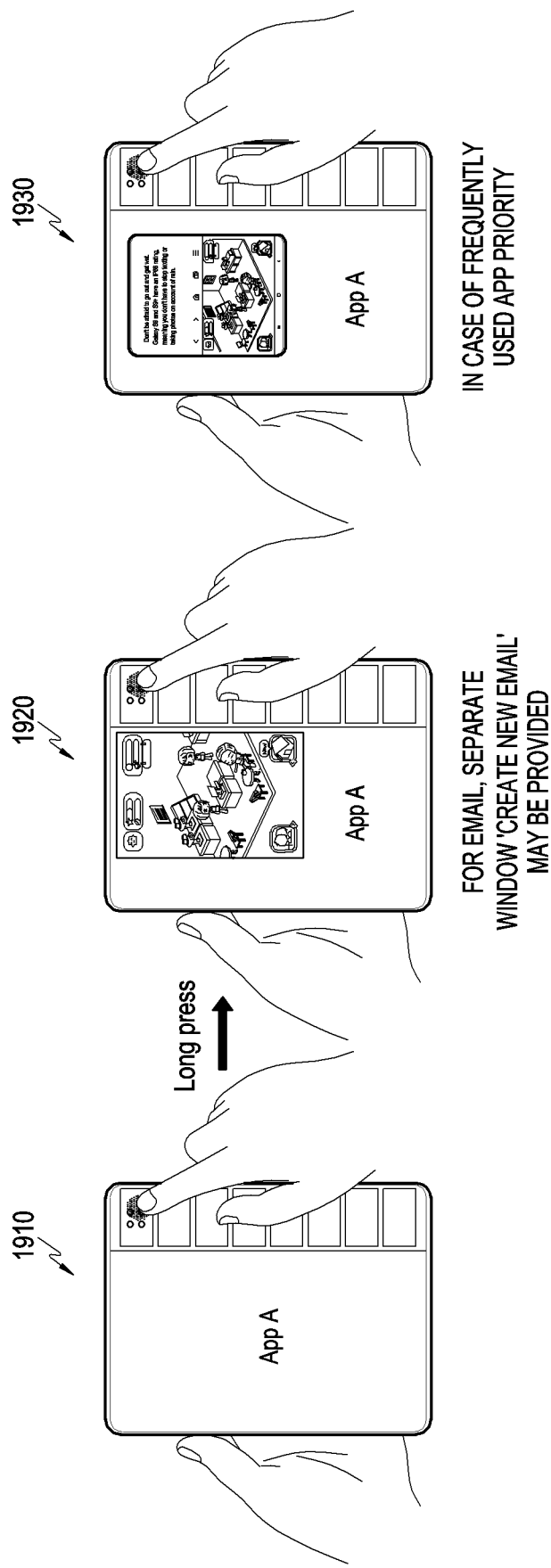
FIG. 19 is a diagram illustrating screen display when an object representing a third application is selected, according to various embodiments.

FIG. 19 is a diagram illustrating example screen display when an object representing a third application is selected, according to various embodiments.

As illustrated in 1910 of FIG. 19, in a state in which at least one graphic object is displayed in the expanded area of the display in response to a sliding operation while a first screen is displayed in a first area of the display, the electronic device 401 may identify a first input for an object corresponding to a third application among at least one graphic object. For example, if the third application is a game application, the electronic device 401 may preview the last execution screen for the game application in response to a first input for the object, as illustrated in 1920 of FIG. 19. Further, as illustrated in 1930 of FIG. 19, the electronic device 401 may provide a preview of the third application in an overlaid form based on priority in response to a second input for the object. For example, the electronic device 401 may determine the priority based on attribute information for the running application (e.g., application A) and the third application (e.g., game application) corresponding to the object. According to an embodiment, the priority may be determined, e.g., in the order of an application having the video attribute, an application having the game attribute, an application having the productivity category attribute, a frequently used application, and other applications. As such, for an application having a purpose of use, such as playing video or game, the electronic device 401 may assign a higher priority than the other applications and display an execution screen having the higher priority, overlaid on other execution screens. Alternatively, the electronic device 401 may display the higher-priority execution screen to occupy a larger area in the entire display area as compared to the other execution screens.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A storage medium storing instructions may be configured to, when executed by at least one processor, enable the at least one processor to perform at least one operation. The at least one operation may comprise displaying an execution screen of a first application in a first area of a flexible display in a first position state, expanding the display to include the first area and a second area, in response to a switch from the first position state to a second position state, displaying, in the second area, at least one object representing an executable application based on application attribute information, as the display is expanded, and displaying, on the expanded display, the execution screen of the first application along with an execution screen of an application corresponding to the selected object, in response to selection of any one of the at least one object.

While the disclosure has been illustrated and described with reference to various example embodiments, it will be understood that the various example embodiments are intended to be illustrative, not limiting. It will be further understood by one of ordinary skill in the art that various changes in form or detail may be made without departing from the true spirit and full scope of the disclosure, including the appended claims and their equivalents.

What is claimed is:

1. An electronic device comprising:
  a housing;
  a flexible display configured to move with respect to the housing so that at least a portion of the flexible display is exposed from an inside of the housing to a front surface of the electronic device; and
  at least one processor,
  wherein the at least one processor is configured to control the flexible display to:
  display an execution screen of a first application in a first area of the flexible display in a first position state,
  during display of the execution screen of the first application in the first area, exposing a second area of the flexible display by moving the flexible display with respect to the housing, in response to an input for a switch from the first position state to a second position state,
  in response to the second area of the display being exposed, display, in the second area, at least one icon representing an executable application based on application attribute information,
  in response to selection of any one of the at least one icon, identify an application having a higher priority among the first application and a second application corresponding to the selected icon, and
  display, on the first and second areas of the flexible display, the execution screen of the first application and an execution screen of a second application corresponding to the selected icon, wherein an execution screen corresponding to the application having the higher priority is to be displayed in a larger portion of the first and second areas of the flexible display.

2. The electronic device of claim 1, wherein the at least one processor is configured to identify whether the first application is a resizable application based on attribute information for the first application, based on the flexible display being exposed.

3. The electronic device of claim 2, wherein the at least one processor is configured to, based on the first application being the resizable application, identify at least one icon representing the at least one executable application based on the application attribute information.

4. The electronic device of claim 2, wherein the at least one processor is configured to, based on the first application not being the resizable application, control the flexible display to display the execution screen of the first application on the first and second areas of the flexible display in a compatibility mode.

5. The electronic device of claim 2, wherein the at least one processor is configured to: control the flexible display to display the at least one identified icon in the second area and, in response to an input for a switch from the second position state to a third position state, control the flexible display to display, on the first and second areas of the flexible display, the execution screen of the first application together with the execution screen of the second application corresponding to the selected icon,
  wherein the second area is changed to a third area having a size greater than a size of the second area, and the execution screen of the second application is displayed in the third area.

6. The electronic device of claim 5, wherein the first position state is a state in which an exposed area of the flexible display is smallest, and the third position state is a state in which the exposed area of the flexible display is largest.

7. The electronic device of claim 1, wherein the application attribute information includes at least one of a size adjustment attribute, a multi-instance attribute, a video attribute, a productivity category attribute, a frequently used application attribute, and a game attribute.

8. The electronic device of claim 1, wherein the at least one processor is configured to: control the flexible display to display, on the flexible display being exposed, based on attribute information for the application corresponding to the selected icon, attribute information for the first application, and priority, in response to selection of any one of the at least one icon.

9. The electronic device of claim 8, wherein the priority is determined in an order of an application with a video attribute, an application with a game attribute, an application with a productivity category attribute, and an application with a frequently used application attribute.

10. A method for providing an execution screen of an application by an electronic device, the method comprising:
  displaying an execution screen of a first application in a first area of a flexible display in a first position state, the flexible display configured to move with respect to the housing of the electronic device so that at least a portion of the flexible display is exposed from an inside of the housing to a front surface of the electronic device;
  during display of the execution screen of the first application in the first area, exposing a second area of the flexible display by moving the flexible display with respect to the housing, in response to an input for a switch from the first position state to a second position state;
  in response to the second area of the flexible display being exposed, displaying, in the second area, at least one icon representing an executable application based on application attribute information;
  in response to selection of any one of the at least one icon, identifying an application having a higher priority among the first application and a second application corresponding to the selected icon; and
  displaying, on the first and second areas of the flexible display, the execution screen of the first application and h an execution screen of a second application corresponding to the selected icon, wherein an execution screen corresponding to the application having the higher priority is displayed in a larger portion of the first and second areas of the flexible display.

11. The method of claim 10, further comprising identifying whether the first application is a resizable application based on attribute information for the first application, based on the flexible display being exposed.

12. The method of claim 11, further comprising:
based on the first application being the resizable application, identifying at least one icon representing the at least one executable application based on the application attribute information.

13. The method of claim 11, wherein displaying the execution screen of the first application and the execution screen of the second application corresponding to the selected icon includes:
based on selection for any one of the at least one icon being detected, in response to an input for a switch from the second position state to a third position state, displaying, on the first and second areas of the flexible display, the execution screen of the first application together with the execution screen of the second application corresponding to the selected icon,
wherein the second area is changed to a third area having a size greater than a size of the second area, and the execution screen of the second application is displayed in the third area.

14. The method of claim 10, wherein the application attribute information includes at least one of a size adjustment attribute, a multi-instance attribute, a video attribute, a productivity category attribute, a frequently used application attribute, and a game attribute.

15. The method of claim 10, wherein displaying the execution screen of the first application and the execution screen of the second application corresponding to the selected icon includes:
displaying, on the flexible display being exposed, based on attribute information for the application corresponding to the selected icon, attribute information for the first application, and priority, in response to selection of any one of the at least one icon.

16. The method of claim 15, wherein the priority is determined in an order of an application with a video attribute, an application with a game attribute, an application with a productivity category attribute, and an application with a frequently used application attribute.

17. A non-transitory computer-readable storage medium having stored thereon instructions which, when executed by at least one processor of an electronic device, cause the electronic device to perform at least one operation, the at least one operation comprising:
displaying an execution screen of a first application in a first area of a flexible display in a first position state, the flexible display configured to move with respect to a housing of the electronic device so that at least a portion of the flexible display is exposed from an inside of the housing to a front surface of the electronic device;
during display of the execution screen of the first application in the first area, exposing a second area of the flexible display by moving the flexible display with respect to the housing, in response to an input for a switch from the first position state to a second position state;
in response to the second area of the flexible display being exposed, displaying, in the second area, at least one icon representing an executable application based on application attribute information;
in response to selection of any one of the at least one icon, identifying an application having a higher priority among the first application and a second application corresponding to the selected icon; and
displaying, on the first and second areas of the flexible display, the execution screen of the first application and an execution screen of a second application corresponding to the selected icon, wherein an execution screen corresponding to the application having the higher priority is displayed in a larger portion of the first and second areas of the flexible display.

* * * * *